(12) United States Patent
Ding et al.

(10) Patent No.: US 11,269,461 B2
(45) Date of Patent: Mar. 8, 2022

(54) TOUCH PANEL, DRIVING METHOD THEREOF, AND DISPLAY DEVICE

(71) Applicant: BOE TECHNOLOGY GROUP CO., LTD., Beijing (CN)

(72) Inventors: Xiaoliang Ding, Beijing (CN); Haisheng Wang, Beijing (CN); Yingming Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 16/650,551

(22) PCT Filed: Feb. 28, 2019

(86) PCT No.: PCT/CN2019/076478
§ 371 (c)(1),
(2) Date: Mar. 25, 2020

(87) PCT Pub. No.: WO2020/172853
PCT Pub. Date: Sep. 3, 2020

(65) Prior Publication Data
US 2021/0223882 A1 Jul. 22, 2021

(51) Int. Cl.
*G06K 9/00* (2006.01)
*G06F 3/043* (2006.01)
*G06F 3/041* (2006.01)
*B06B 1/06* (2006.01)

(52) U.S. Cl.
CPC ............ *G06F 3/043* (2013.01); *B06B 1/0688* (2013.01); *G06F 3/04166* (2019.05); *G06K 9/0002* (2013.01)

(58) Field of Classification Search
CPC ... G06F 3/043; G06F 3/04166; B06B 1/0688; G06K 9/0002
See application file for complete search history.

(56) References Cited

U.S. PATENT DOCUMENTS

| | | | |
|---|---|---|---|
| 2016/0124560 A1* | 5/2016 | Watazu | H01L 41/0478 345/173 |
| 2016/0364063 A1* | 12/2016 | Wang | G06F 1/3262 |
| 2018/0080839 A1* | 3/2018 | Taghibakhsh | G01H 3/005 |

* cited by examiner

*Primary Examiner* — Jonathan A Boyd
(74) *Attorney, Agent, or Firm* — Dave Law Group LLC; Raj S. Dave

(57) ABSTRACT

A touch panel, a driving method thereof, and a display device are disclosed. The touch panel includes a touch detection structure and a fingerprint identification structure; the touch panel includes a first electrode, a circuit structure, and a piezoelectric layer which are stacked. The first electrode includes a plurality of first sub-electrode strips arranged in a first direction and extending in a second direction, and the circuit structure includes a plurality of circuit sub-structures arranged in an array in the first direction and the second direction, each of the circuit sub-structures includes a detection electrode; in the first direction, an orthographic projection of each of the first sub-electrode strips on a main surface of the piezoelectric layer covers orthographic projections of detection electrodes of at least two circuit sub-structures on the main surface of the piezoelectric layer.

20 Claims, 7 Drawing Sheets

TOUCH PANEL, DRIVING METHOD THEREOF, AND DISPLAY DEVICE

CROSS-REFERENCE

The present application is the U.S. national stage of International Patent Application No. PCT/CN2019/076478, filed on Feb. 28, 2019, the entire disclosure of which is incorporated herein by reference as part of the present application.

TECHNICAL FIELD

At least one embodiment of the present disclosure relates to a touch panel, a driving method thereof, and a display device.

BACKGROUND

At present, the application of ultrasonic technology in fingerprint identification is a hot research direction. The ultrasonic fingerprint identification structure is a three-layered structure, which includes a driving electrode, a receiving electrode and a piezoelectric layer located between the driving electrode and the receiving electrode. Upon a driving voltage being applied to the driving electrode and the receiving electrode, the piezoelectric layer is excited by the driving voltage to generate an inverse piezoelectric effect and emit a first ultrasonic wave outward. After contacting a finger, the first ultrasonic wave is reflected back to form a second ultrasonic wave by the finger. Because the finger includes valleys and ridges, the vibration intensities of the second ultrasonic wave reflected by the valleys and ridges to the piezoelectric layer by the finger are different. In this case, upon a fixed voltage being applied to the driving electrode, the piezoelectric layer converts the second ultrasonic wave into a voltage signal, which is transmitted to the fingerprint identification module through the receiving electrode, and positions of the valleys and ridges can be judged according to the voltage signal.

SUMMARY

At least one embodiment of the present disclosure provides a touch panel, a driving method thereof, and a display device.

At least one embodiment of the present disclosure provides a touch panel, comprising:

a first electrode, a circuit structure, and a piezoelectric layer that are stacked, wherein the first electrode, the circuit structure, and the piezoelectric layer that are stacked are configured to function as a touch detection structure and a fingerprint identification structure;

the piezoelectric layer is configured to emit and/or receive an ultrasonic wave;

the circuit structure is configured as an ultrasonic detection portion of the fingerprint identification structure;

in a plane parallel to a main surface of the piezoelectric layer, the first electrode comprises a plurality of first sub-electrode strips arranged in a first direction and extending in a second direction, the circuit structure comprises a plurality of circuit sub-structures arranged in an array in the first direction and the second direction, each of the plurality of circuit sub-structures comprises a detection electrode; and in the first direction, an orthographic projection of each of the plurality of first sub-electrode strips on the main surface of the piezoelectric layer covers orthographic projections of detection electrodes of at least two of the plurality of circuit sub-structures on the main surface of the piezoelectric layer.

For example, the touch panel further includes:

a plurality of detection lines extending in the first direction and a plurality of gate lines extending along the second direction, wherein each of the circuit sub-structures further comprises a first thin film transistor;

each of the gate lines is connected with a gate electrode of the first thin film transistor;

each of the detections line is connected with one of a source electrode and a drain electrode of the first thin film transistor;

the detection electrode of the circuit sub-structure is configured to be connected with the drain electrode of the first thin film transistor corresponding to the source electrode connected with the detection line or the source electrode of the first thin film transistor corresponding to the drain electrode connected with the detection line.

For example, upon the circuit structure being configured as the ultrasonic detection portion of the touch detection structure, the plurality of circuit sub-structures function as a plurality of touch detection regions arranged in an array in the first direction and the second direction;

a row of the touch detection regions arranged along the second direction is a touch detection region group, and a plurality of touch detection region groups arranged in the first direction correspond to the plurality of first sub-electrode strips in one-to-one correspondence.

For example, any two adjacent detection lines of the plurality of detection lines connected with the plurality of circuit sub-structures in a column of the touch detection regions arranged in the first direction are respectively connected with a source electrode and a drain electrode of a second thin film transistor;

the touch panel further comprises a signal line extending in the second direction, and the signal line is connected with a gate electrode of the second thin film transistor.

For example, the touch detection structure is reused as the fingerprint identification structure, and the touch detection structure is a stacked structure comprising the first electrode, the circuit structure, and the piezoelectric layer located between the first electrode and the circuit structure.

For example, the piezoelectric layer comprises a first piezoelectric layer and a second piezoelectric layer, and the touch detection structure and the fingerprint identification structure comprise an ultrasonic excitation portion and an ultrasonic detection portion which are shared;

the ultrasonic excitation portion comprises the first electrode, a second electrode, and the first piezoelectric layer located between the first electrode and the second electrode, which are stacked;

the ultrasonic detection portion comprises the circuit structure, a third electrode, and the second piezoelectric layer located between the circuit structure and the third electrode, which are stacked.

For example, the touch panel further includes an operation surface for touch detection or fingerprint identification, wherein the ultrasonic excitation portion is located on a side of the ultrasonic detection portion away from the operation surface.

For example, the second electrode and the third electrode are plate-shaped electrodes covering the plurality of touch detection regions, and are configured to be applied with a fixed voltage.

For example, the second electrode and the third electrode are a same electrode.

For example, the piezoelectric layer comprises a first piezoelectric layer and a second piezoelectric layer;

the touch detection structure and the fingerprint identification structure share an ultrasonic excitation portion;

the ultrasonic excitation portion comprises the first electrode, a second electrode, and the first piezoelectric layer located between the first electrode and the second electrode, which are stacked;

the second electrode comprises a plurality of second sub-electrode strips arranged along the second direction and extending in the first direction.

For example, the ultrasonic excitation portion is reused as a first ultrasonic detection portion of the touch detection structure;

the fingerprint identification structure further comprises a second ultrasonic detection portion;

the second ultrasonic detection portion comprises the circuit structure, the second electrode, and the second piezoelectric layer located between the circuit structure and the second electrode, which are stacked; or, the second ultrasonic detection portion comprises the circuit structure, the first electrode, and the second piezoelectric layer located between the circuit structure and the first electrode, which are stacked.

For example, the touch panel further comprises: an operation surface for touch detection or fingerprint identification, wherein the second ultrasonic detection portion is located on a side of the ultrasonic excitation portion facing the operation surface.

Another embodiment of the present disclosure provides a display device, comprising a display panel and the above-mentioned touch panel, the touch panel is located on a non-display side of the display panel.

Another embodiment of the present disclosure provides a driving method of the touch panel, comprising a touch detection stage and a fingerprint identification stage, wherein the driving method comprises:

applying a first electrical signal to the first sub-electrode strip of an N-th row to excite the piezoelectric layer to emit a first ultrasonic signal;

the piezoelectric layer converts a second ultrasonic signal reflected back from a side of an operation surface for touch detection or fingerprint identification of the touch panel into a second electrical signal, and the circuit structure outputs the second electrical signal, N is an integer greater than or equal to 1, and less than or equal to a total number of the first sub-electrode strips.

For example, the touch detection structure is reused as the fingerprint identification structure, and the touch detection structure is a stacked structure comprising the first electrode, the circuit structure, and the piezoelectric layer located between the first electrode and the circuit structure, and the plurality of circuit sub-structures are divided into a plurality of touch detection regions arranged in an array in the first direction and the second direction, and a row of the touch detection regions arranged along the second direction is a touch detection region group, and a plurality of touch detection region groups arranged in the first direction correspond to the plurality of first sub-electrode strips in one-to-one correspondence, the touch detection stage comprises a first ultrasonic emitting stage and a first detection stage;

the first ultrasonic emitting stage comprises: applying the first electrical signal to the first sub-electrode strip of the N-th row, and applying a fixed voltage to the plurality of circuit sub-structures comprised in the touch detection regions of the N-th row corresponding to the first sub-electrode strip of the N-th row to excite the piezoelectric layer to emit the first ultrasonic signal;

the first detection stage comprises: applying a fixed voltage to the first sub-electrode strip of the N-th row, and outputting the second electrical signal through the plurality of circuit sub-structures comprised in the touch detection regions of the N-th row to perform touch detection.

For example, the fingerprint identification stage comprises a second ultrasonic emitting stage and a second detection stage;

the second ultrasonic emitting stage comprises: after judging that a position of the first sub-electrode strip of an M-th row is a touch region according to the touch detection stage, applying the first electrical signal to the first sub-electrode strip of the M-th row, and applying a fixed voltage to the plurality of circuit sub-structures comprised in the touch detection region of the M-th row corresponding to the first sub-electrode strip of the M-th row to excite the piezoelectric layer to emit the first ultrasonic signal; or, applying the first electrical signal to each of the plurality of first sub-electrode strips, and applying a fixed voltage to each of the plurality of circuit sub-structures to excite the piezoelectric layer to emit the first ultrasonic signal;

the second detection stage comprises: applying a fixed voltage to the first sub-electrode strip of the M-th row, and outputting the second electrical signal through the circuit sub-structures in each row in the touch detection regions of the M-th row to perform fingerprint identification, M is an integer greater than or equal to 1, and less than or equal to the total number of the first sub-electrode strips.

For example, the piezoelectric layer comprises a first piezoelectric layer and a second piezoelectric layer, the touch detection structure and the fingerprint identification structure share a ultrasonic excitation portion and an ultrasonic detection portion, and the ultrasonic excitation portion comprises the first electrode, a second electrode and the first piezoelectric layer located between the first electrode and the second electrode, which are stacked; the ultrasonic detection portion comprises the circuit structure, a third electrode and the second piezoelectric layer located between the circuit structure and the third electrode, which are stacked; the plurality of circuit sub-structures are divided into a plurality of touch detection regions arranged in an array in the first direction and the second direction, a row of the touch detection regions arranged along the second direction is a touch detection region group, and a plurality of touch detection region groups arranged in the first direction correspond to the plurality of first sub-electrode strips in one-to-one correspondence, the touch detection stage comprises a first ultrasonic emitting stage and a first detection stage;

the first ultrasonic emitting stage comprises: applying the first electrical signal to the first sub-electrode strip of the N-th row, and applying a fixed voltage to the second electrode to excite the first piezoelectric layer to emit the first ultrasonic signal;

the first detection stage comprises: applying a fixed voltage to the third electrode, and outputting the second electrical signal through the touch detection regions of the N-th row corresponding to the first sub-electrode strip of the N-th row to perform touch detection.

For example, the fingerprint identification stage comprises a second ultrasonic emitting stage and a second detection stage, the second ultrasonic emitting stage comprises: after judging that a position of the first sub-electrode strip of an M-th row is a touch region according to the touch detection stage, applying the first electrical signal to the first sub-electrode strip of the M-th row, and applying a fixed voltage to the second electrode to excite the first piezoelectric layer to emit the first ultrasonic signal; or, applying the first electrical signal to each of first sub-electrode strips, and applying a fixed voltage to the second electrode to excite the first piezoelectric layer to emit the first ultrasonic signal;

the second detection stage comprises: applying a fixed voltage to the third electrode, and outputting the second electrical signal through the circuit sub-structures of each row in the touch detection regions of the M-th row corresponding to the first sub-electrode strip of the M-th row for fingerprint identification, M is an integer greater than or equal to 1, and less than or equal to the total number of the first sub-electrode strips.

For example, the touch panel further comprises a plurality of detection lines extending in the first direction and a plurality of gate lines extending in the second direction, each of the gate lines is connected with a gate electrode of a first thin film transistor comprised in the circuit sub-structure, and each of the detection lines is connected with one of a source electrode and a drain electrode of the first thin film transistor comprised in the circuit sub-structure;

the gate line is configured as a switching signal transmission line of the circuit sub-structure;

upon the first thin film transistor being in an ON state, the detection line is configured to detect an electrical signal;

any two adjacent detection lines of the plurality of detection lines connected with the plurality of circuit sub-structures in a column of the touch detection regions arranged in the first direction are respectively connected with a source electrode and a drain electrode of a second thin film transistor;

the touch panel further comprises: a signal line extending in the second direction, the signal line is connected with a gate electrode of the second thin film transistor, and configured to transmit a signal to turn on or off the second thin film transistor, in the first detection stage, a first turn-on voltage is input to the gate line connected with the circuit sub-structure in the touch detection regions of N-th row to make the circuit sub-structure in a working state, and the second thin film transistor is input with a second turn-on voltage by the signal line to conduct the plurality of detection lines connected with the plurality of circuit sub-structures in the touch detection regions of a column;

in the second detection stage, the first turn-on voltage is input to the gate lines connected with the circuit sub-structures in the touch detection regions of the M-th row to sequentially make the circuit sub-structures of each row in an operating state and the second thin film transistor is in an OFF state.

For example, the piezoelectric layer comprises a first piezoelectric layer and a second piezoelectric layer, the touch detection structure and the fingerprint identification structure share a ultrasonic excitation portion, the ultrasonic excitation portion comprises the first electrode, a second electrode and the first piezoelectric layer located between the first electrode and the second electrode, which are stacked, the second electrode comprises a plurality of second sub-electrode strips arranged along the second direction and extending in the first direction, the touch detection stage comprises a first ultrasonic emitting stage, which comprises: applying the first electrical signal to the first sub-electrode strip of the N-th row, and applying a fixed voltage to each of the second sub-electrode strips to excite the first piezoelectric layer to emit the first ultrasonic signal;

the ultrasonic excitation portion is reused as a first ultrasonic detection portion of the touch detection structure, and the touch detection stage further comprises a first detection stage, which comprises: applying a fixed voltage to the first sub-electrode strip of the N-th row, and outputting a third electrical signal converted by the first piezoelectric layer into a third electrical signal through the second sub-electrode to perform touch detection.

For example, the fingerprint identification structure further comprises a second ultrasonic detection portion comprising the circuit structure, the second electrode, and the second piezoelectric layer located between the circuit structure and the second electrode, which are stacked, the fingerprint identification stage comprises a second ultrasonic emitting stage, which comprises: after judging that a position of the first sub-electrode strip of the M-th row and the second sub-electrode strip of the M-th column is a touch region according to the touch detection stage, applying the first electric signal to the first sub-electrode strip of the M-th row and applying a fixed voltage to the second sub-electrode strip of the M-th column to excite the first piezoelectric layer to emit the first ultrasonic signal; or, applying the first electrical signal to each of the first sub-electrode strips, and applying a fixed voltage to each of the second sub-electrode strips to excite the first piezoelectric layer to emit the first ultrasonic signal;

the fingerprint identification stage further comprises a second detection stage, which comprises applying a fixed voltage to the second sub-electrode strips of the M-th column or applying a fixed voltage to each of the second sub-electrode strips, and outputting the second electric signals converted by the second piezoelectric layer into the second electric signals by the second piezoelectric layer through the circuit sub-structures in the row corresponding to the first sub-electrode strips of the M-th row in the direction perpendicular to the main plane of the second piezoelectric layer, M is an integer greater than or equal to 1, and less than or equal to the total number of the first sub-electrode strips.

For example, the fingerprint identification structure further comprises a second ultrasonic detection portion comprising the circuit structure, the first electrode, and the second piezoelectric layer located between the circuit structure and the first electrode, which are stacked, the fingerprint identification stage further comprises a second ultrasonic emitting stage, which comprises: after judging that a position of the first sub-electrode strip of the M-th row and the second sub-electrode strip of the M-th column is a touch region according to the touch detection stage, applying the first electric signal to the first sub-electrode strip of the M-th row, applying a fixed voltage to the second sub-electrode strip of the M-th column to excite the first piezoelectric layer to emit the first ultrasonic signal, or applying the first electric signal to each first sub-electrode strip and applying a fixed voltage to each of the second sub-electrode strips, the fingerprint identification stage further comprises a second detection stage, which comprises: applying a fixed voltage to the first sub-electrode strips of the M-th row or applying a fixed voltage to each of the first sub-electrode strips, and outputting the second electric signal generated by the second piezoelectric layer under the action of the reflected second ultrasonic signal through the circuit sub-structures in each row corresponding to the first sub-electrode strip of the M-th row in the direction perpendicular to the main plane of the second piezoelectric layer to perform fingerprint identification, M is an integer greater than or equal to 1, and less than or equal to the total number of the first sub-electrode strips.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

Figure 1A:
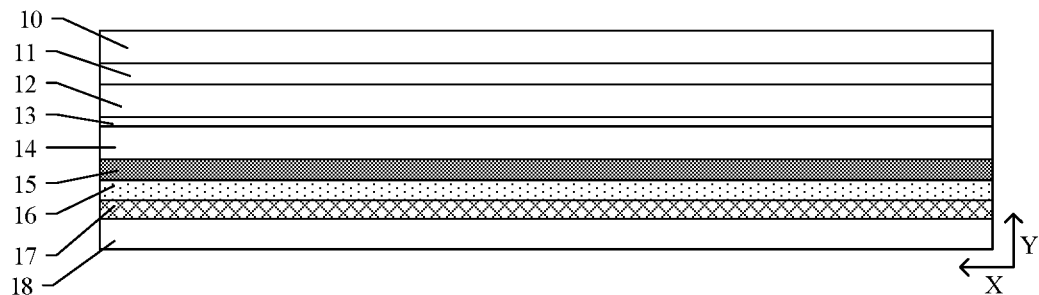
FIG. 1A shows a display device including an ultrasonic fingerprint identification structure and a mutual capacitive touch detection structure.

FIG. 1A shows a display device including an ultrasonic fingerprint identification structure and a mutual capacitive touch detection structure. The display device shown in FIG. 1A is a highly integrated device. As illustrated by FIG. 1A, the display device places an ultrasonic fingerprint identification structure in an organic light emitting diode display panel, so that the display panel is integrated with functions of display, touch control and fingerprint identification. The display device includes a cover glass 10, a touch structure 11, a first base substrate 12, a cathode layer 13, a light emitting layer 14 and a pixel array layer 15 of an organic light emitting diode, a piezoelectric layer 16, a drive electrode layer 17, and a second substrate 18, which are sequentially stacked (stacked in the Y direction as illustrated by FIG. 1A). The ultrasonic fingerprint identification structure includes a driving electrode layer 17, a pixel array layer 15 and a piezoelectric layer 16 located between the two layers, and the three-layered structure forms a piezoelectric sandwich structure of the fingerprint identification structure. The driving electrode layer 17 is a whole metal layer, and the pixel array layer 15 functions as both a pixel circuit for organic light emitting diode display and a receiving electrode of an ultrasonic fingerprint identification structure. The touch control structure included in the display device is a common capacitive touch control structure, and the touch control structure is located on a side, used for display, of the light emitting layer 14.

Figure 1B:
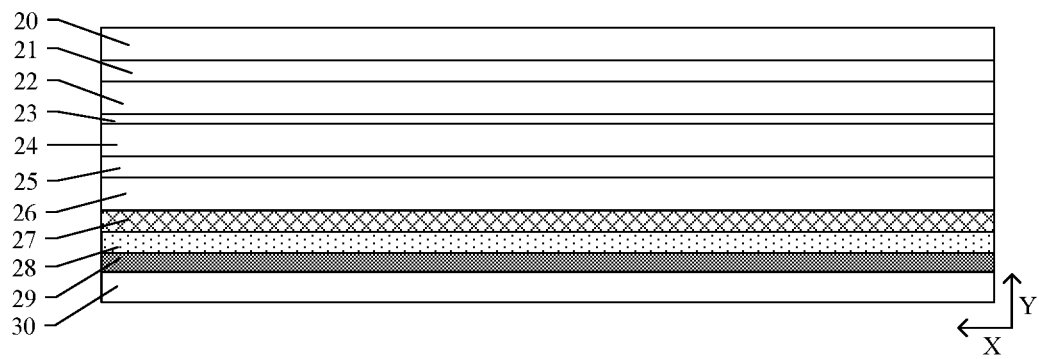
FIG. 1B shows another display device including an ultrasonic fingerprint identification structure and a mutual capacitive touch detection structure.

FIG. 1B is another display device including an ultrasonic fingerprint identification structure and a mutual capacitive touch detection structure. Compared with the display device shown in FIG. 1A, the display device shown in FIG. 1B is a less integrated device. As illustrated by FIG. 1B, the display device includes a cover glass 20, a touch structure 21, a first base substrate 22, a cathode layer 23, a light emitting layer 24 and a pixel array layer 25 of an organic light emitting diode, a second base substrate 26, an ultrasonic fingerprint identification structure located on a side of the second substrate 26 away from the pixel array layer 25, and a third substrate 30 located on a side of the ultrasonic identification structure away from the second substrate 26, which are stacked in this order (stacked in the Y direction as illustrated by FIG. 1B). The ultrasonic fingerprint identification structure shown in FIG. 1B includes a driving electrode layer 27, a receiving circuit structure layer 29, and a piezoelectric layer 28 located between the two layers, and the three-layered structure forms a piezoelectric sandwich structure of the fingerprint identification structure. The display device shown in FIG. 1B places the ultrasonic fingerprint identification structure on the side of the organic light emitting diode display module away from the cover glass 20, i.e., the ultrasonic fingerprint identification structure is implemented in an externally mounting manner.

Figure 1C:
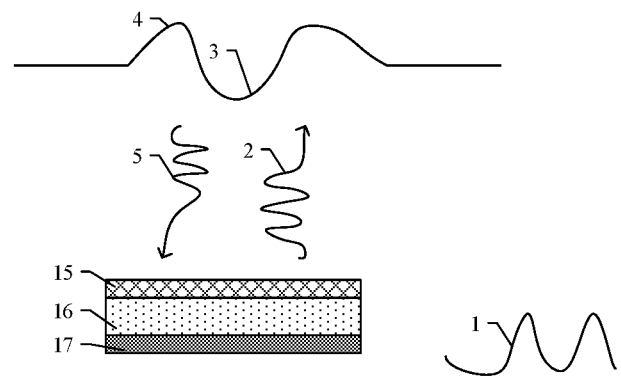
FIG. 1C is a schematic diagram showing the working principle of the ultrasonic fingerprint identification structure shown in FIG. 1A.

FIG. 1C is a schematic diagram showing the working principle of the ultrasonic fingerprint identification structure shown in FIG. 1A. As illustrated by FIG. 1C, upon a high-voltage sinusoidal electrical signal 1 being applied to the drive electrode layer 17 and a fixed voltage being applied to the pixel array layer 15, the piezoelectric layer 16 is excited by the voltage to generate an inverse piezoelectric effect and emit a first ultrasonic wave 2 outward. After contacting the finger, the first ultrasonic wave 2 is reflected back to form a second ultrasonic wave 5 by the finger. Because the finger fingerprint includes valleys 3 and ridges 4, the vibration intensities of the second ultrasonic wave 5 reflected back to the piezoelectric layer 16 at different positions of the finger fingerprint are different. At this time, stop driving the pixel array layer 15 and change the driving electrode layer 17 to a fixed voltage, then the piezoelectric layer 16 converts the second ultrasonic wave 5 into a voltage signal which is transmitted to the integrated circuit through the pixel array layer 15, and the integrated circuit judges positions of the valleys 3 and ridges 4 of the finger according to the voltage signal.

The embodiments of the present disclosure provide a touch panel, a driving method thereof, and a display device. The touch panel includes a first electrode, a circuit structure, and a piezoelectric layer which are stacked; the first electrode, the circuit structure, and the piezoelectric layer which are stacked are configured to function as a touch detection structure and a fingerprint identification structure; the piezoelectric layer is configured to emit and/or receive an ultrasonic wave; the circuit structure is configured to function as an ultrasonic detection portion of the fingerprint identification structure; in a plane parallel to a main surface of the piezoelectric layer, the first electrode includes a plurality of first sub-electrode strips arranged in a first direction and extending in a second direction, the circuit structure includes a plurality of circuit sub-structures arranged in an array in the first direction and the second direction, and each of the plurality of circuit sub-structures includes a detection electrode. In the first direction, an orthographic projection of each of the plurality of first sub-electrode strips on the main surface of the piezoelectric layer covers orthographic projections of the detection electrodes of at least two circuit sub-structures on the main surface of the piezoelectric layer. According to the touch panel provided by the embodiments of the present disclosure, touch detection and fingerprint identification can be achieved by ultrasonic waves, and fingerprint identification can be performed on a touch region after the touch region is judged through touch detection to improve identification accuracy and reduce identification time.

Hereinafter, the touch panel, the driving method thereof, and the display device provided by the embodiments of the present disclosure will be described below with reference to the accompanying drawings.

Figure 2A:
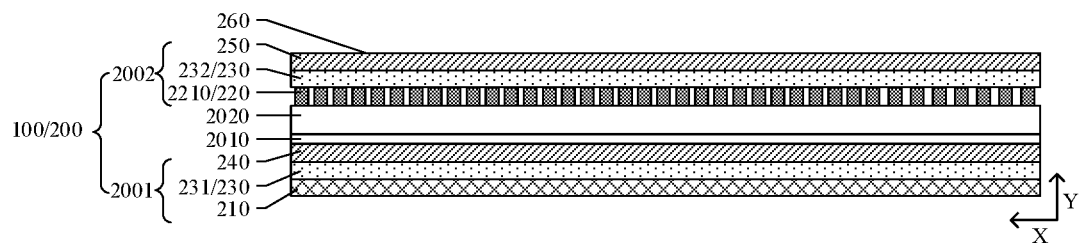
FIG. 2A is a partial cross-sectional structural diagram of a touch panel according to an example of an embodiment of the present disclosure.

At least one embodiment of the present disclosure provides a touch panel. FIG. 2A is a partial cross-sectional structural schematic diagram of the touch panel provided in an embodiment of the present disclosure, FIG. 2B is a partial planar structural schematic diagram of the first electrode shown in FIG. 2A, FIG. 2C is a partial planar structural schematic diagram of the circuit structure shown in FIG. 2A, FIG. 2D is a simplified structural schematic diagram of FIG. 2C, FIG. 2E is a timing diagram of a touch detection stage, FIG. 2F is a timing diagram of a fingerprint identification stage, and FIG. 2H is a schematic diagram of a circuit sub-structure shown in FIG. 2C.

Figure 2B:
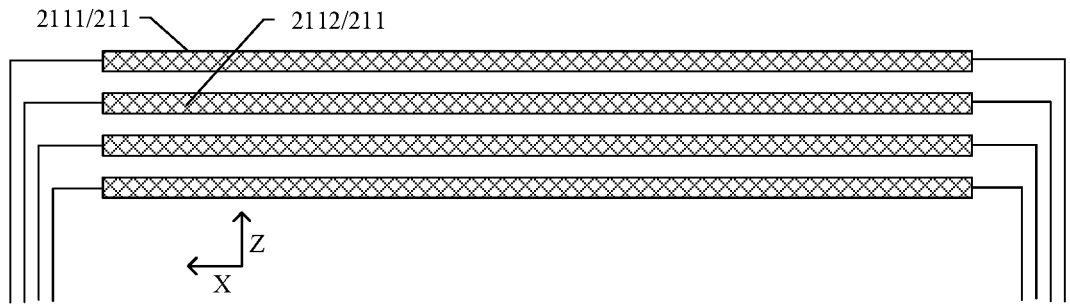
FIG. 2B is a schematic diagram of a partial planar structure of a first electrode shown in FIG. 2A.
Figure 2C:
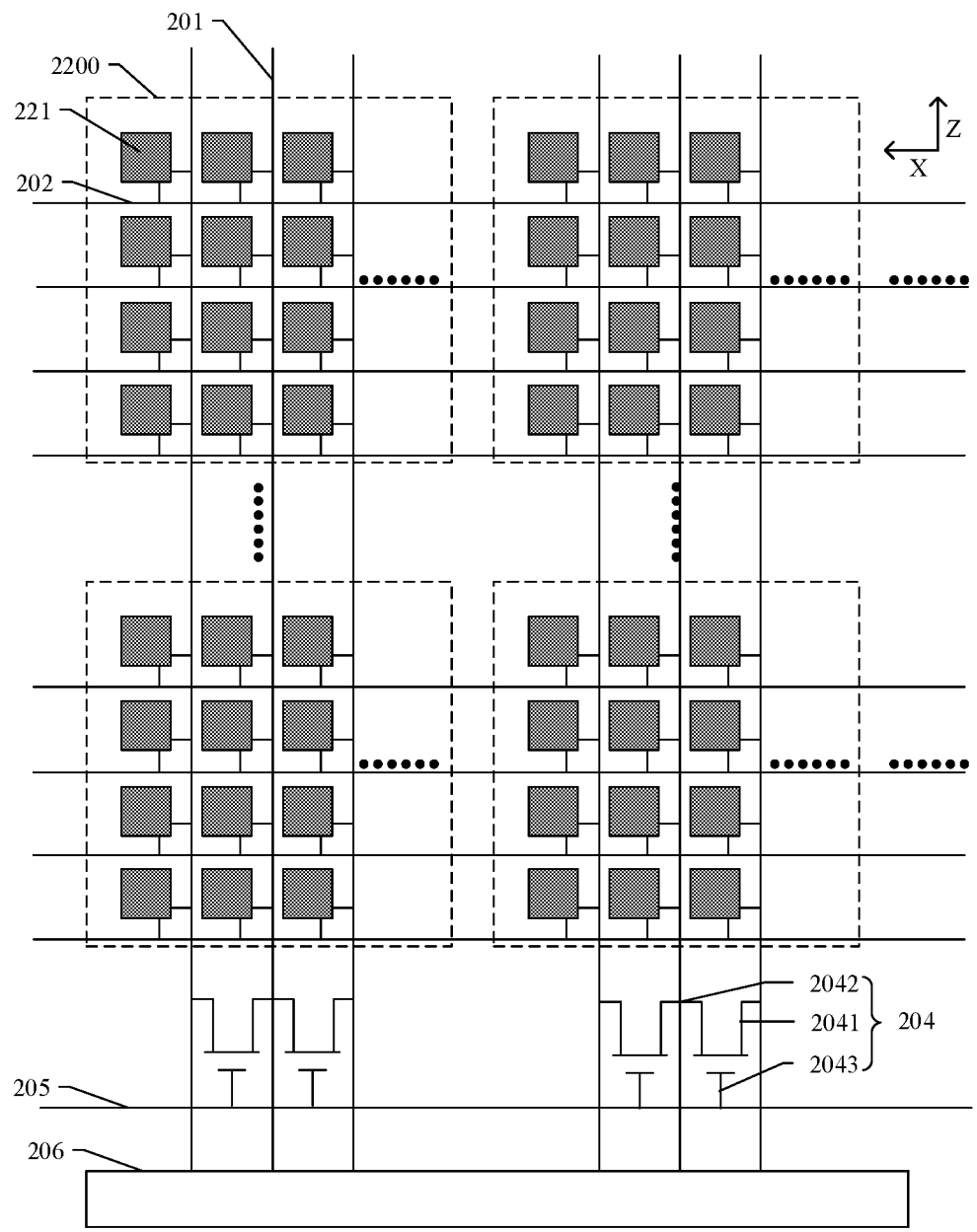
FIG. 2C is a partial plan view of a circuit structure shown in FIG. 2A.
Figure 2D:
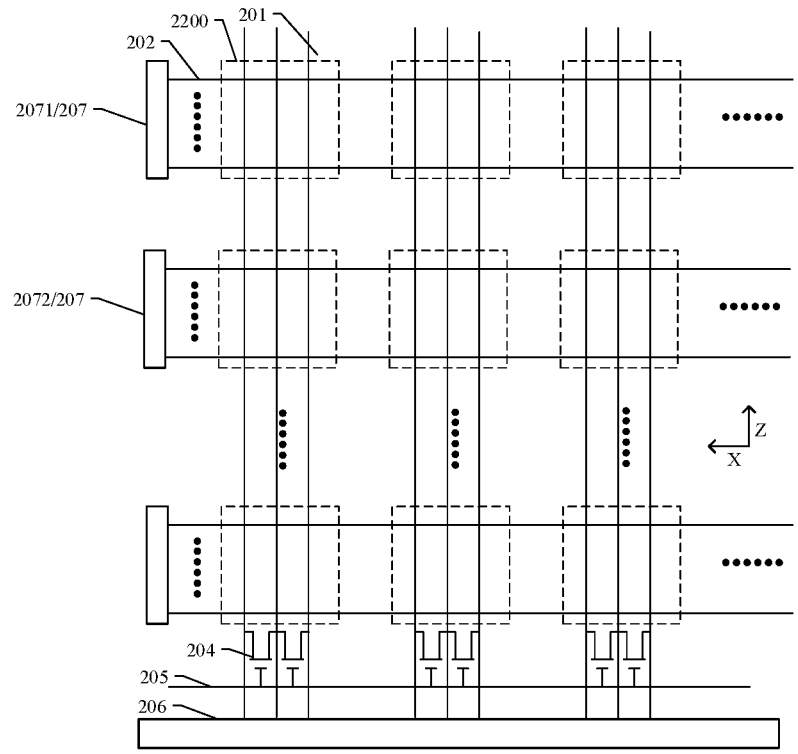
FIG. 2D is a simplified structural diagram shown in FIG. 2C.
Figure 2E:
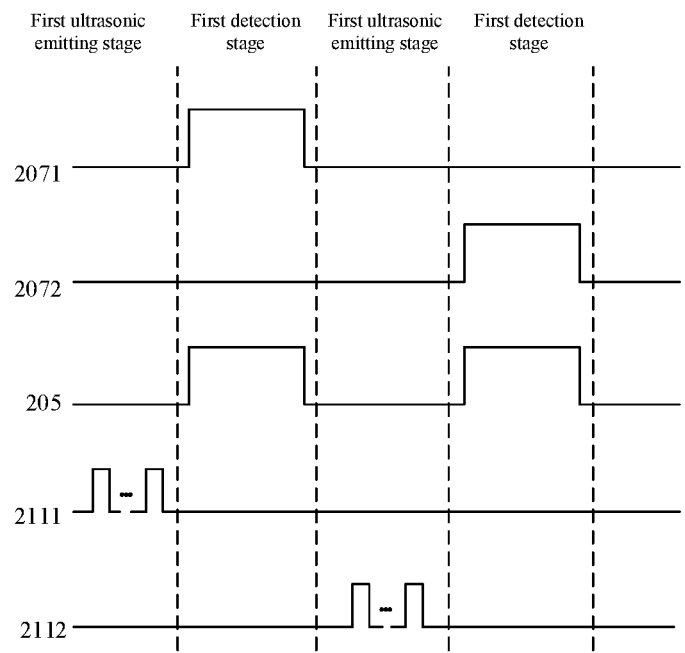
FIG. 2E is a timing chart of a touch detection stage of the touch panel shown in FIG. 2A.
Figure 2F:
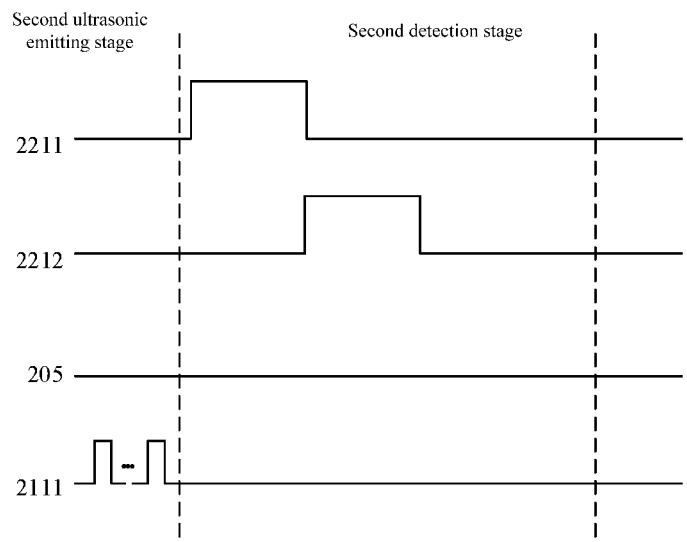
FIG. 2F is a timing chart of a fingerprint identification stage of the touch panel shown in FIG. 2A.

As illustrated by FIGS. 2A-2C, the touch panel includes a touch detection structure 100 and a fingerprint identification structure 200. The touch detection structure 100 and the fingerprint identification structure 200 include a first electrode 210, a circuit structure 220, and a piezoelectric layer 230 which are stacked, and the stacked arrangement here refers to being stacked in the Y direction shown in FIG. 2A.

As illustrated by FIGS. 2A-2C and 2H, in a plane parallel to the main surface of the piezoelectric layer 230, i.e., in the XZ plane shown in the figure, the first electrode 210 includes a plurality of first sub-electrode strips 211 arranged in a first direction (i.e., Z direction) and extending in a second direction (i.e., X direction), and the circuit structure 220 includes a plurality of circuit sub-structures 221 arranged in an array in the first direction and the second direction, each of the circuit sub-structures 221 includes a detection electrode 2210. In the first direction, an orthographic projection of each of first sub-electrode strips 211 on the main surface of the piezoelectric layer 230 covers orthographic projections of the detection electrodes 2210 of at least two circuit sub-structures 221 on the main surface of the piezoelectric layer 230, that is, in the first direction, the size of each of first sub-electrode strips 211 is at least more than twice the size of the detection electrode 2210 of each of circuit sub-structures 221, and in the Y direction, the first sub-electrode strip 111 is overlapped with the circuit sub-structures 221. For example, the orthographic projection of each of first sub-electrode strip 211 on the main surface of the piezoelectric layer 230 may also cover orthographic projections of at least two circuit sub-structures 221 on the main surface of the piezoelectric layer 230.

For example, as illustrated by FIGS. 2A to 2D, the piezoelectric layer 230 includes a first piezoelectric layer 231 and a second piezoelectric layer 232. The touch detection structure 100 and the fingerprint identification structure 200 include a ultrasonic excitation portion 2001 and an ultrasonic detection portion 2002 which are shared by the touch detection structure 100 and the fingerprint identification structure 200, i.e., the ultrasonic excitation portion of the touch detection structure is reused as an ultrasonic excitation portion of the fingerprint identification structure, and the ultrasonic detection portion of the touch detection structure is reused as an ultrasonic detection portion of the fingerprint identification structure. The ultrasonic excitation portion 2001 includes a first electrode 210, a second electrode 240, and a first piezoelectric layer 231 located between the first electrode 210 and the second electrode 240, and the ultrasonic detection portion 2002 includes a circuit structure 220, a third electrode 250, and a second piezoelectric layer 232 located between the circuit structure 220 and the third electrode 250, which are stacked. The touch panel provided by the embodiments can adopt ultrasonic technology to achieve touch detection and fingerprint detection, and after a touch region is judged through touch detection, fingerprint identification on the touch region can improve identification accuracy and reduce identification time.

For example, as illustrated by FIGS. 2C and 2H, the touch panel further includes a plurality of detection lines 201 extending in a first direction and a plurality of gate lines 202 extending in a second direction. The gate line 202 and the detection line 201 are respectively connected with each of the circuit sub-structures 221, the gate line 202 is connected with a gate electrode of the first thin film transistor T3 included in the circuit sub-structure 221, the detection line 201 is connected with one of the source electrode and drain electrode of the first thin film transistor T3 included in the circuit sub-structure 221. The detection electrode 2210 of the circuit sub-structure 221 is configured to be connected with the drain electrode of the first thin film transistor T3 corresponding to the source electrode connected with the detection line 201 or the source electrode of the first thin film transistor T3 corresponding to the drain electrode connected with the detection line 201, where the connection of the detection electrode to the other one of the source electrode and drain electrode of the first thin film transistor T3 may be direct connection or indirect connection through other components, for example, the detection electrode 2210 is connected to the other one of the source electrode and drain electrode of the first thin film transistor T3 through a fourth thin film transistor T2 shown in FIG. 2H. A plurality of detection lines 201 are all connected with an integrated circuit (IC) 206. The gate line 202 functions as a switching signal input line of the circuit sub-structure 221 and inputs a switching signal for the first thin film transistor T3. Upon the first thin film transistor T3 being in an ON state, the detection line 201 is configured to transmit an electrical signal.

For example, as illustrated by FIG. 2H, the circuit sub-structure 221 in the present embodiment may include a plurality of thin film transistors (e.g., T1-T3), a detection electrode 2210, and a diode. For example, one of the source electrode and drain electrode of the third thin film transistor T1 is connected with the detection electrode 2210. Upon the third thin film transistor T1 being in an ON state, a driving voltage Vq can be transmitted to the detection electrode 2210, at which time the drive electrode is input with an AC voltage signal, and the piezoelectric layer located between the detection electrode and the drive electrode can emit an ultrasonic wave. Upon the third thin film transistor T1 being in an OFF state, the detection electrode 2210 is not input with a voltage signal. At this time, after the drive electrode is input with a fixed voltage signal, the piezoelectric layer starts to receive an ultrasonic wave and converts the ultrasonic signals into an electrical signal, the electrical signal is input from the detection electrode 2210 to the gate electrode of the fourth thin film transistor T2, and the voltage input from the detection electrode 2210 to the gate electrode of the fourth thin film transistor T2 varies with the intensity of the ultrasonic signal. Upon a first electrode of the fourth thin film transistor T2 is input with a fixed voltage, different voltages at point A can control a second electrode of the fourth thin film transistor T2 to output different currents. The gate electrode of the first thin film transistor T3 is connected with the gate line 202. After the gate line 202 is input with a turn-on electrical signal to turn on the thin film transistor, different currents output by the second electrode of the fourth thin film transistor T2 are input to the first electrode of the first thin film transistor T3, and the currents are transmitted to the integrated circuit 206 through the detection line 201 connected with the second electrode of the first thin film transistor T3 to perform touch or fingerprint detection.

However, upon the gate line 202 being not input with a turn-on electrical signal, the first thin film transistor T3 is in an OFF state, and the circuit sub-structure 221 cannot transmit the electric signal to the detection line 201. The diode included in the circuit sub-structure is connected with a bias voltage source. Upon the bias voltage input to the diode is at a high level, it can play a role in selecting ultrasonic echo signals. In this case, the echo signals generated by the previous echo at point A can be eliminated and echo sampling can be started. After sampling, the bias voltage is at a low level so that the following echo signals will not affect the electrical potential at point A. In other words, the phase upon the bias voltage being at a high level is the echo sampling phase to collect effective ultrasonic signals and eliminate interfering echo signals.

For example, as illustrated by FIGS. 2C-2D, the plurality of circuit sub-structures 221 are divided into a plurality of touch detection regions 2200 arranged in an array along the first direction and the second direction.

In the embodiment of the present disclosure, each of the touch detection regions 2200 functions as one touch detection unit, each of the circuit sub-structures 221 functions as one fingerprint identification detection unit, and each of the touch detection regions 2200 includes at least two rows and two columns of circuit sub-structures 221.

For example, as illustrated by FIGS. 2C-2D, two adjacent detection lines 201 of the plurality of detection lines 201 connected with the plurality of circuit sub-structures 221 in the same column of touch detection regions 2200 arranged in the first direction are respectively connected with the source electrode 2041 and drain electrode 2042 of one second thin film transistor 204. There is no connection relationship between detection lines 201 connected by a plurality of circuit sub-structures 221 in two adjacent rows of touch detection regions 2200. That is, the plurality of detection lines 201 connected with the plurality of circuit sub-structures 221 included in each of the touch detection regions 2200 are connected through the source electrode and drain electrode of the plurality of second thin film transistors 204, and gate electrodes of the plurality of second thin film transistors 204 are connected with the signal lines 205. Upon the signal line 205 being gated, all the second thin film transistors 204 corresponding to each of the touch detection regions 2200 are in an ON state, a plurality of detection lines 201 of each of the touch detection regions 2200 are electrically connected; upon the signal line 205 being not gated and all the second thin film transistors 204 are in the OFF state, the detection lines 201 of each of the touch detection regions 2200 are not conductive to each other.

For example, a plurality of gate lines 202 connected with a plurality of circuit sub-structures 221 in a row of touch detection regions 2200 arranged in the second direction are electrically connected with a row driving unit 207, that is, the row of touch detection regions 2200 arranged in the second direction is a touch detection region group, and the touch detection region group is electrically connected with the row driving unit 207. Moreover, a plurality of gate lines 202 in touch detection regions 2200 of different rows are electrically connected with different row driving (GOA, gate driver on array) units 207, that is, different touch detection region groups are electrically connected with different row driving units 207. In the present embodiment, the first direction is a column direction in which the touch detection regions 2200 are arranged, and the second direction is a row direction in which the touch detection regions 2200 are arranged.

For example, as illustrated by FIGS. 2A-2D, in a direction perpendicular to the main plane of the piezoelectric layer 230, a row of touch detection regions 2200 is opposite to one first sub-electrode strip 211, i.e., the orthographic projections of a row of touch detection regions 2200 on the piezoelectric layer 230 is overlapped with the orthographic projection of one first sub-electrode strip 211 on the piezoelectric layer 230. A number of rows of the touch detection regions 2200 is equal to a number of the first sub-electrode strips 211, that is, the plurality of rows of touch detection regions 2200 correspond to the plurality of first sub-electrode strips 211 in one-to-one correspondence, that is, the plurality of touch detection region groups correspond to the plurality of first sub-electrode strips are in one-to-one correspondence.

For example, as illustrated by FIG. 2A, the ultrasonic detection portion 2002 further includes a first substrate 2020 for carrying the circuit structure 220.

For example, as illustrated by FIG. 2A, the ultrasonic excitation unit 2001 is bonded to the ultrasonic detection unit 2002 through the first colloid 2010.

For example, as illustrated by FIG. 2A, the touch panel further includes an operation surface 260 for touch detection or fingerprint identification, and the operation surface 260 for touch detection or fingerprint identification is a surface of the touch panel for achieving touch detection or fingerprint identification. The ultrasonic excitation portion 2001 is located on a side of the ultrasonic detection portion 2002 away from the operation surface 260 for touch detection or fingerprint identification to reduce adverse effects of the ultrasonic excitation portion 2001 on the ultrasonic detection portion 2002 during touch detection and fingerprint identification. In the touch device including the touch panel, the operation surface can be a surface of the cover plate of the touch device, and at this time, the ultrasonic excitation portion is located on a side of the ultrasonic detection portion away from the cover plate.

For example, the second electrode 240 and the third electrode 250 in the present embodiment are plate-shaped electrodes, that is, in the XZ plane, the second electrode 240 and the third electrode 250 are whole electrodes covering a plurality of touch detection regions 2200. Also, the second electrode 240 and the third electrode 250 are configured to be applied with a fixed voltage. The second electrode and the third electrode in the present embodiment are arranged as whole electrodes, which can simplify debugging.

For example, materials of the second electrode 240 and the third electrode 250 may be metal materials or other conductive materials, and the present embodiment is not limited thereto.

For example, the material of the piezoelectric layer 230 in the present embodiment may include a piezoelectric polymer material such as polyvinylidene fluoride (PVDF), and the present embodiment includes but is not limited thereto. In the present embodiment, the materials of the first piezoelectric layer 231 and the second piezoelectric layer 232 may be the same or different, as long as they can be excited to generate an ultrasonic signal and convert the received ultrasonic signal into an electrical signals.

For example, the material of the first electrode 210 in the present embodiment may be a metal material or other conductive materials, and the present embodiment is not limited here.

For example, the driving method of the touch panel provided in the present embodiment includes a touch detection stage and a fingerprint identification stage, including: applying a first electrical signal to the first sub-electrode strip 211 of an N-th row to excite the piezoelectric layer 230 to emit a first ultrasonic signal; the circuit structure 220 outputs a second electrical signal generated by the piezoelectric layer 230 acting on the reflected second ultrasonic signal, N is an integer greater than or equal to 1, and less than or equal to a total number of the first sub-electrode strips.

As illustrated by FIGS. 2A to 2F, the touch detection structure 100 and the fingerprint identification structure 200 in the present embodiment share the ultrasonic excitation portion 2001 and the ultrasonic detection portion 2002.

For example, upon the ultrasonic excitation unit 2001 being used as the ultrasonic excitation unit of the touch detection structure 100, the touch detection stage includes a first ultrasonic emitting stage, which includes applying a first electrical signal (e.g., a high voltage sinusoidal wave signal) to the first sub-electrode strip 211 of the N-th row (e.g., the first sub-electrode strips 2111 of the first row or the first sub-electrode strips 2112 of the second row), applying a fixed voltage to the second electrode 240 to excite the first piezoelectric layer 231 to generate an inverse piezoelectric effect and emit a first ultrasonic signal.

The inverse piezoelectric effect here refers to that, upon an electric field being applied in the polarization direction of the material of the piezoelectric layer, the material of the piezoelectric layer generates mechanical deformation or mechanical stress in a certain direction, i.e. conversion between electrical energy and mechanical energy. If the applied electrical signal is a high-frequency electrical signal, the material of the piezoelectric layer will generate a high-frequency acoustic signal, that is, an ultrasonic signal.

For example, upon the ultrasonic detection unit 2002 being used as the ultrasonic detection unit of the touch detection structure 100, the touch detection stage further includes a first detection stage, which includes applying a fixed voltage to the third electrode 250, outputting a second electrical signal generated by the second piezoelectric layer 232 under the action of the reflected second ultrasonic signal through the touch detection regions 2200 of the N-th row corresponding to the first sub-electrode strip 211 of the N-th row, and thus performing touch detection.

For example, the first ultrasonic signal may be reflected by an object at a touch position, such as a finger, and may also be reflected by air at a non-touch position. In the present embodiment, the ultrasonic signals reflected back to the second piezoelectric layer 232 by the finger at the touch position and the air at the non-touch position are both referred to as second ultrasonic signals. At this time, upon a fixed voltage being input to the third electrode 250, the second piezoelectric layer 232 converts the second ultrasonic signal into a second electrical signal, and the circuit sub-structures 221 in the touch detection regions 2200 of the N-th row transmits the second electrical signal to the integrated circuit 206 through the detection line 201 to perform touch detection.

Because the difference in reflectivity of ultrasonic waves reflected by fingers and other film layers in the touch panel is small, the strength of a second ultrasonic signal reflected by an external object (e.g., a finger) at the touch position is small, while the difference in reflectivity of ultrasonic waves reflected by air at the non-touch position and the abovementioned film layer is large, the strength of a second ultrasonic signal reflected by air at the non-touch position is large, and the second piezoelectric layer converts the second ultrasonic signal with different strength into a second electric signal with different strength, so that the touch position can be distinguished according to the strength of the second electric signal.

For example, in the first ultrasonic emitting stage, the first piezoelectric layer 231 emits a first ultrasonic signal after a first electrical signal is applied to the first sub-electrode strips 2111 of the first row. In the first detection stage, a first turn-on voltage (e.g., a high-level signal) is input to the plurality of gate lines 202 connected with the circuit sub-structures 221 included in the touch detection regions 2200 of the first row through the first row driving unit 2071 corresponding to the touch detection regions 2200 of the first row, so that all the circuit sub-structures 221 included in the touch detection regions 2200 of the row are in an operating state, and the detection line 201 connected with the plurality of circuit sub-structures 221 included in the touch detection regions 2200 of the row can transmit the second electrical signal received by the circuit sub-structures 221 to the integrated circuit 206. After the detection is completed, the first piezoelectric layer 231 emits a first ultrasonic signal after the first electrical signal is applied to the first sub-electrode strips 2112 of the second row in the next first ultrasonic emitting stage. In the next first detection stage, the second row driving unit 2072 corresponding to the touch detection regions 2200 of the second row inputs a first turn-on voltage to the plurality of gate lines 202 connected with the circuit sub-structures 221 included in the touch detection regions 2200 of the row, so that all the circuit sub-structures 221 included in the touch detection regions 2200 of the row are in an operating state, and the detection line 201 connected with the plurality of circuit sub-structures 221 included in the touch detection regions 2200 of the row can transmit the second electrical signal received by the circuit sub-structures 221 to the integrated circuit 206. According to the above driving process, the transmission of the first ultrasonic signal and the detection of the second ultrasonic signal are sequentially performed until touch detection is completed.

The above-mentioned circuit sub-structures are in a working state, which refers to that the circuit sub-structures can transmit the second electrical signal generated by the second piezoelectric layer to the detection line.

The above-mentioned method of applying of the first electrical signal to the first sub-electrode strip can be performed in a double-ended driving manner to reduce loading.

For example, upon the circuit sub-structure 221 outputting a second electrical signal (i.e., in the first detection stage), the second thin film transistor 204 is input with a second turn-on voltage (e.g., a high level signal) by the signal line 205 to connect the plurality of detection lines 201 connected with the plurality of circuit sub-structures 221 in one column of touch detection regions 2200, so that the electrical signal received by the circuit sub-structures 221 in each column of touch detection regions 2200 can be equivalent to being output to the integrated circuit 206 through one detection line 201 to judge the touch position. That is, each of the detection lines 201 is connected with one interface (not shown in the figure) of the integrated circuit 206. Upon the second thin film transistor 204 being in the ON state, because the plurality of detection lines 201 connected with the plurality of circuit sub-structures 221 in a column of touch detection regions 2200 are electrically connected, only one interface can be used to transmit the second electrical signal to the integrated circuit 206 for touch detection, thus saving power. In the first ultrasonic emitting stage, the signal line 205 is input to a low level, and the second thin film transistor 204 is turned off For example, the fingerprint identification stage includes a second ultrasonic emitting stage and a second detection stage.

For example, upon the ultrasonic excitation unit 2001 being used as the ultrasonic excitation unit of the fingerprint identification structure 200, the second ultrasonic emitting stage includes: after determining that the position of the first sub-electrode strip 211 of an M-th row (M is an integer equal to or greater than 1, and equal to or less than a total number of the first sub-electrode strips) is a touch region according to the touch detection stage, applying a first electrical signal on the first sub-electrode strip 211 of the M-th row, and applying a fixed voltage to the second electrode 220 to excite the first piezoelectric layer 231 to emit a first ultrasonic signal. The present embodiment is not limited thereto, and it is also possible to apply all the first sub-electrode strips with the first electrical signal.

For example, upon the ultrasonic detection unit 2002 is used as the ultrasonic detection unit of the fingerprint identification structure 200, the second detection stage includes applying a fixed voltage to the third electrode 250, and outputting a second electrical signal through each row of circuit sub-structures 221 in the touch detection regions 2200 of the M-th row corresponding to first sub-electrode strips 211 of the M-th row to perform fingerprint identification.

For example, after the first ultrasonic signal contacts a finger, the second ultrasonic signal is reflected back to the second piezoelectric layer 232. At this time, when a fixed voltage is applied to the third electrode 250, the second piezoelectric layer 232 converts the second ultrasonic signal into a second electrical signal, and the circuit sub-structures 221 in the touch detection regions 2200 of the M-th row corresponding to the first sub-electrode strip 211 of the M-th row transmit the second electrical signal to the integrated circuit 206 line by line for fingerprint identification.

For example, upon the circuit sub-structures 221 outputting the second electrical signal generated by the second piezoelectric layer 232, the row driving unit 207 controls the plurality of gate lines 202 included in the touch detection regions 2200 of the row to input a first turn-on voltage row by row to the circuit sub-structures 221 so that the circuit sub-structures 221 are in an operating state row by row, and the detection lines 201 connected with the plurality of circuit sub-structures 221 included in the touch detection regions 2200 of the row output second electrical signals to the integrated circuit 206 in one-to-one correspondence for fingerprint identification.

In the fingerprint identification stage, the second thin film transistor 204 connected with the adjacent detection lines 201 is always in the OFF state so that the plurality of detection lines 201 connected with each column of circuit sub-structures 221 in one column of touch detection regions 2200 are not conductive to each other.

For example, as illustrated by FIG. 2F, M is 1, and in the second ultrasonic emitting stage, a high voltage sinusoidal wave signal is applied to the first sub-electrode strips 2111 of the first row to excite the first piezoelectric layer 231 to emit a first ultrasonic signal. In the second detection stage, the circuit sub-structures 2211 of a plurality of rows are in an operating state row by row by sequentially inputting a first turn-on voltage to the plurality of gate lines 202 connected with the circuit sub-structures 221 of a plurality of rows such as the circuit sub-structures 2211 of the first row, the circuit sub-structures 2212 of the second row, and the like, and the detection line 201 connected with the circuit sub-structures 221 can transmit the second electrical signals received by the circuit sub-structures 221 to the integrated circuit 206.

After the first ultrasonic signal contacts the finger, because the finger includes valleys and ridges, the intensities of the second ultrasonic signals reflected back by the valleys and ridges are different (the intensity of the second ultrasonic signal reflected back by the valleys is greater than the intensity of the second ultrasonic signal reflected back by the ridges), and the magnitudes of the second electrical signals converted by the second piezoelectric layer are different, so the fingerprint identification module included in the integrated circuit can achieve fingerprint identification according to the magnitudes of the second electrical signals.

In the present embodiment, the ultrasonic signal generated by the first piezoelectric layer is referred to as the first ultrasonic signal, and the reflected ultrasonic signal received by the second piezoelectric layer is referred to as the second ultrasonic signal, regardless of the touch detection or fingerprint identification stage.

Figure 2G:
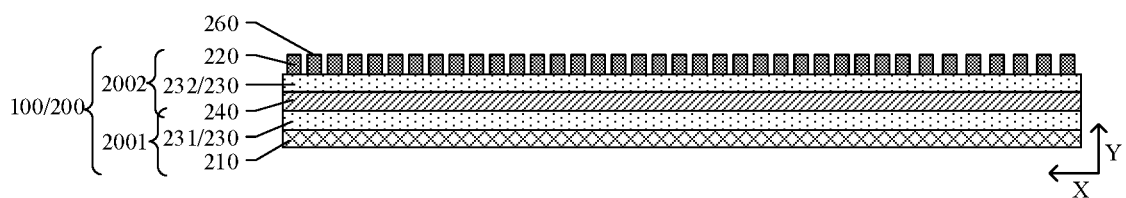
FIG. 2G is a partial structural diagram of a touch panel provided by another example of an embodiment of the present disclosure.
Figure 2H:
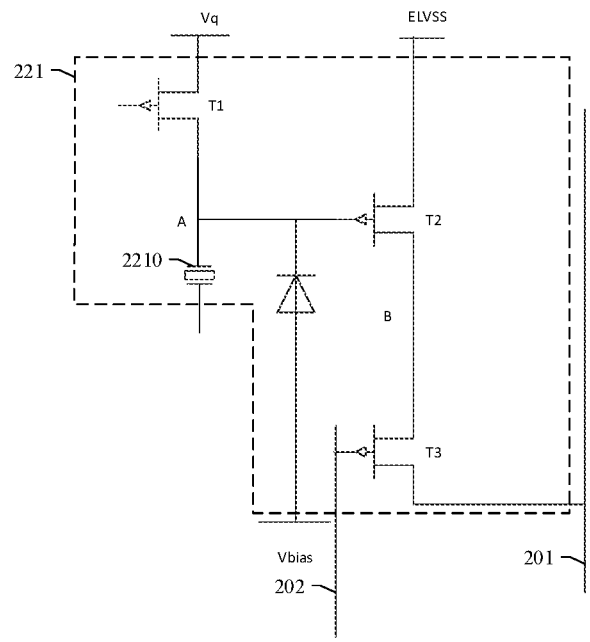
FIG. 2H is a schematic diagram of a circuit sub-structure shown in FIG. 2C.

FIG. 2G is a partial structural diagram of a touch panel provided by another example of the embodiment. As illustrated by FIG. 2G, unlike the touch panel in the example shown in FIG. 2A, the touch panel in this example is different in that the second electrode and the third electrode in this example are the same electrode, and this example is both referred to as the second electrode 240, that is, the ultrasonic excitation portion 2001 and the ultrasonic detection portion 2002 in this example share the second electrode 240, and this second electrode 240 functions to provide a fixed value of driving voltage for the first piezoelectric layer 231 and the second piezoelectric layer 232 in the first ultrasonic emitting stage, the second ultrasonic emitting stage, the first detection stage, and the second detection stage. The driving method of the touch panel in this example is the same as the driving method of the touch panel in the example shown in FIG. 2A, and will not be repeated here.

Figure 3:
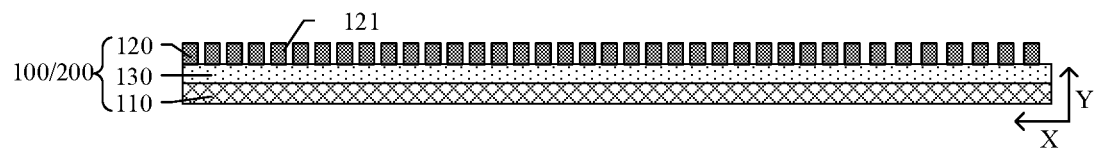
FIG. 3 is a partial cross-sectional structural diagram of a touch panel according to another embodiment of the present disclosure.

FIG. 3 is a partial sectional structural diagram of a touch panel according to another embodiment of the present disclosure. For example, as illustrated by FIG. 3, the touch panel includes a touch detection structure 100 and a fingerprint identification structure 200. The touch detection structure 100 is reused as a fingerprint identification structure 200, and the touch detection structure 100 is a three-layered structure (i.e., a piezoelectric sandwich structure) including a first electrode 110, a circuit structure 120, and a piezoelectric layer 130 located between the first electrode 110 and the circuit structure 120. The thickness of the touch panel provided by the embodiment is relatively thin, and thinning design can be achieved.

The planar structures of the first electrode 110 and the circuit structure 120 in the present embodiment are the same as those of the first electrode 210 and the circuit structure 220 in the embodiment shown in FIGS. 2B-2D. The touch detection region formed by dividing the plurality of circuit sub-structures included in the circuit structure 120 in the present embodiment is the same as the touch detection region 2200 shown in FIGS. 2C and 2D. the specific structure of the circuit sub-structure in the present embodiment is the same as the specific structure of the circuit sub-structure in the embodiment shown in FIG. 2A, and the connection relationship between the circuit sub-structures and the gate lines and the detection lines in the present embodiment is the same as the connection relationship shown in FIGS. 2B and 2C, which will not be repeated here.

For example, the driving method of the touch panel provided in the present embodiment includes a touch detection stage and a fingerprint identification stage. The touch detection stage includes a first ultrasonic emitting stage and a first detection stage.

For example, as illustrated by FIG. 3, upon the first electrode 110, the circuit structure 120, and the piezoelectric layer 130 being used as the piezoelectric sandwich structure of the touch detection structure 100 for touch detection, the first ultrasonic emitting stage includes: applying a first electrical signal (a high-voltage sinusoidal wave signal, for example, a voltage of 100V or more) on the first sub-electrode strip of an N-th row (N is an integer greater than or equal to 1, and less than or equal to a total number of the first sub-electrode strips). A fixed voltage is applied to a plurality of circuit sub-structures included in the touch detection regions of the N-th row corresponding to the first sub-electrode strip of the N-th row so that the piezoelectric layer is excited by the voltage to generate an inverse piezoelectric effect and emit a first ultrasonic signal outwards.

For example, applying a fixed voltage to the circuit sub-structures in the touch detection regions of the N-th row includes turning on the third thin film transistor T1 as illustrated by FIG. 2H, and inputting the fixed voltage from the third thin film transistor T1 to the detection electrodes 2210.

For example, the first detection stage includes: applying a fixed voltage to the first sub-electrode strip of the N-th row, and outputting a second electrical signal generated by the piezoelectric layer under the action of the reflected second ultrasonic signal through the touch detection regions of the N-th row for touch detection.

For example, the first ultrasonic signal may be reflected by an object at a touch position, such as a finger and air at a non-touch position. In the present embodiment, ultrasonic signals reflected back to the piezoelectric layer 230 at the touch position and the non-touch position are both referred to as second ultrasonic signals. At this time, the driving of the circuit sub-structures is stopped, and the high-voltage sinusoidal wave signal applied on the first sub-electrode strip is changed into a fixed voltage, so that the piezoelectric layer converts the second ultrasonic signal into a second electrical signal, and the circuit sub-structures in the touch detection region transmit the second electrical signal to the integrated circuit through the detection line.

For example, according to the circuits shown in FIGS. 2C and 2D, upon the circuit sub-structures in the row touch detection regions of the N-th row receiving the second electrical signal, a first turn-on voltage is input to a plurality of gate lines connected with all the circuit sub-structures included in the touch detection regions of the row through a row driving unit corresponding to the touch detection regions of the row, so that all the circuit sub-structures included in the touch detection regions of the row are in a working state, and the detection lines connected with the plurality of circuit sub-structures included in the touch detection regions can transmit the second electrical signals received by the circuit sub-structures to the integrated circuit.

The circuit sub-structures in the present embodiment are in the working state, which refers to that the circuit sub-structures can receive the driving voltage transmitted by the integrated circuit to the circuit sub-structures through the detection line, and the circuit sub-structures can transmit the second electrical signals generated by the piezoelectric layer to the detection line.

For example, according to the circuits shown in FIGS. 2C and 2D, upon the circuit sub-structures outputting the second electrical signal generated by the piezoelectric layer, the signal line inputs a second turn-on voltage for the second thin film transistor connected with the two adjacent detection lines to conduct the plurality of detection lines connected with the plurality of circuit sub-structures in a row of touch detection regions, so that the electrical signal received by the circuit sub-structures in each row of touch detection regions can be equivalent to being output to the integrated circuit through one detection line to judge the touch position. In the first ultrasonic emitting stage, the second thin film transistor is in an OFF state. The operation principle of the circuit sub-structures in the first detection stage in the present embodiment is the same as that of the circuit sub-structures in the first detection stage in the embodiment shown in FIGS. 2A to 2F.

For example, the fingerprint identification stage includes a second ultrasonic emitting stage and a second detection stage.

For example, upon the first electrode 110, the circuit structure 120, and the piezoelectric layer 130 being used as the piezoelectric sandwich structure of the fingerprint identification structure 200 for fingerprint identification, according to the circuits shown in FIGS. 2C and 2D, the second ultrasonic emitting stage includes: after determining that the position of the first sub-electrode strip of the M-th row is a touch region according to the touch detection stage, applying a first electrical signal (high voltage sinusoidal wave signal) to the first sub-electrode strip of the M-th row, and applying a fixed voltage to a plurality of circuit sub-structures included in the touch detection region of the M-th row corresponding to the first sub-electrode strip of the M-th row to excite the piezoelectric layer to emit a first ultrasonic signal. The present embodiment is not limited thereto, but it is also possible to apply all the first sub-electrode strips with a first electrical signal and to apply the circuit sub-structures with a fixed voltage.

For example, the second detection stage includes: applying a fixed voltage to the first sub-electrode strip of the M-th row, and outputting a second electrical signal through each row of circuit sub-structures in the touch detection regions of the M-th row for fingerprint identification.

For example, after the first ultrasonic signal contacts the finger, the second ultrasonic signal is reflected back to the piezoelectric layer. At this time, the driving of the circuit sub-structures is stopped, and the high-voltage sinusoidal wave signal input to the first sub-electrode strip is changed into a fixed voltage, so that the piezoelectric layer converts the second ultrasonic signal into a second electrical signal, and the circuit sub-structures in the touch detection region transmits the second electrical signal to the integrated circuit through the detection line.

For example, according to the circuits shown in FIGS. 2C and 2D, upon each row of circuit sub-structures outputs a second electrical signal, the row driving unit controls a plurality of gate lines included in the touch detection regions of the row to input a first turn-on voltage row by row into the circuit sub-structures so that the circuit sub-structures are in an operating state row by row, and detection lines connected with the plurality of circuit sub-structures included in the touch detection regions of the row output the second electrical signal to the integrated circuits in one-to-one correspondence for fingerprint identification.

In the fingerprint identification stage, the thin film transistor is always in an OFF state so that a plurality of detection lines connected with each column of circuit sub-structures in a column of touch detection regions are not conductive to each other.

In the present embodiment, the ultrasonic signal generated by the piezoelectric layer is referred to as the first ultrasonic wave and the reflected ultrasonic signal received by the piezoelectric layer is referred to as the second ultrasonic signal, regardless of the touch detection or fingerprint identification stage.

Figure 4A:
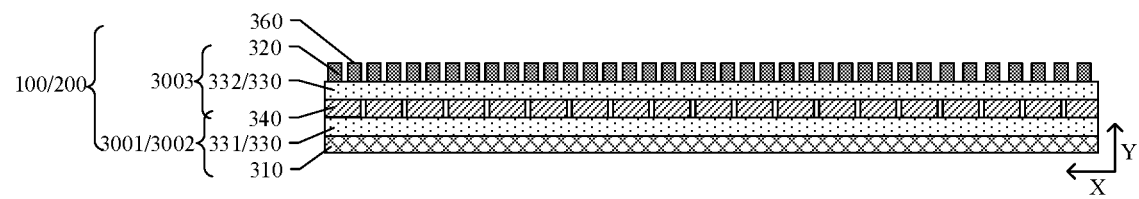
FIG. 4A is a partial cross-sectional structural diagram of a touch panel according to another embodiment of the present disclosure.
Figure 4B:
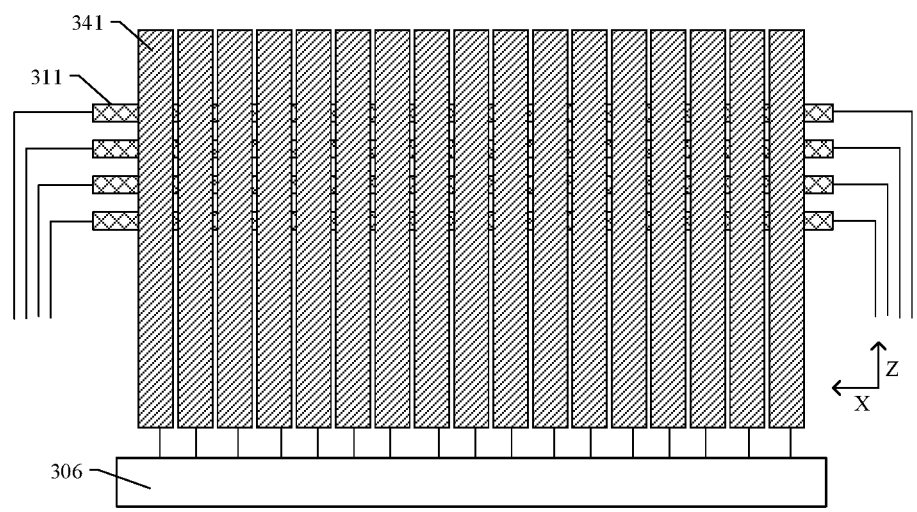
FIG. 4B is a schematic diagram of a partial planar structure of a first electrode and a second electrode shown in FIG. 4A.
Figure 4C:
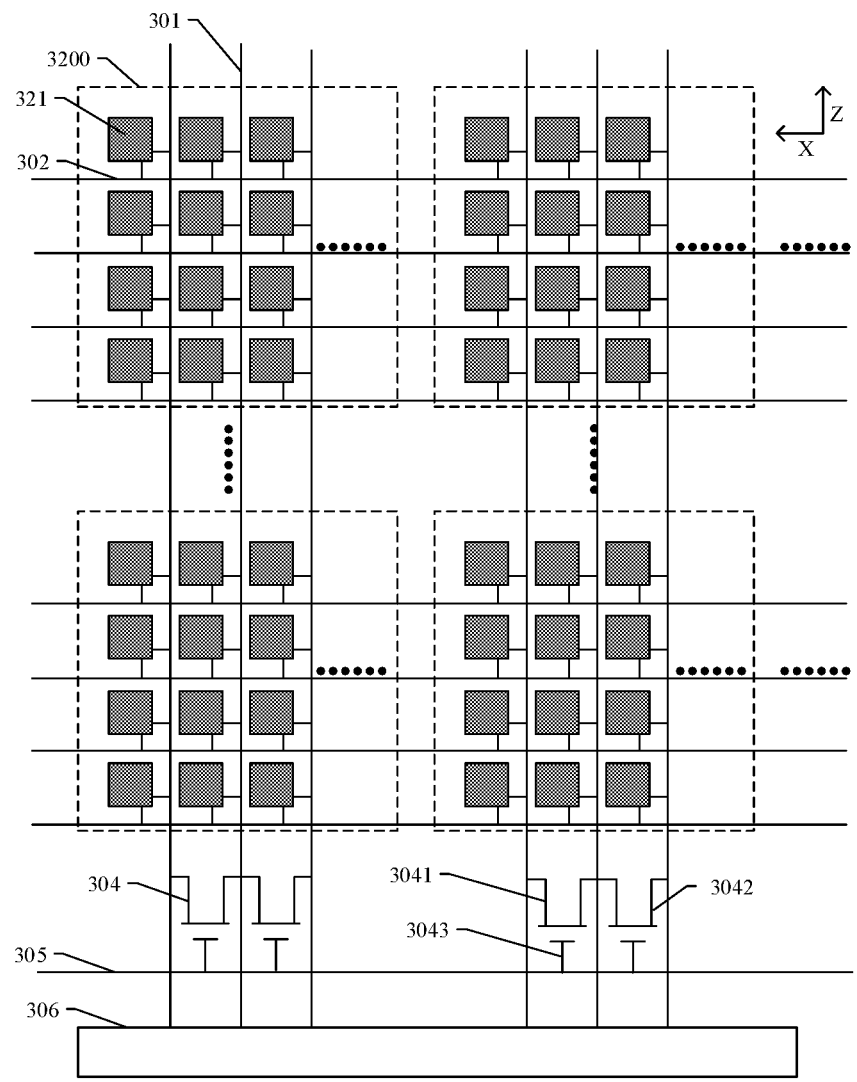
FIG. 4C is a partial plan view of the circuit structure shown in FIG. 4A.

Another embodiment of the present disclosure provides a touch panel. FIG. 4A is a partial cross-sectional structural schematic diagram of the touch panel provided in the embodiment of the present disclosure, FIG. 4B is a partial planar structural schematic diagram of the first electrode and the second electrode shown in FIG. 4A, and FIG. 4C is a partial planar structural schematic diagram of the circuit structure shown in FIG. 4A. As illustrated by FIGS. 4A-4C, the touch panel includes a touch detection structure 100 and a fingerprint identification structure 200. The touch detection structure 100 and the fingerprint identification structure 200 include a first electrode 310, a circuit structure 320, and a piezoelectric layer 330 which are stacked.

As illustrated by FIGS. 4A-4C, in a plane parallel to the main surface of the piezoelectric layer 330, i.e., in the XZ plane shown in the figure, the first electrode 310 includes a plurality of first sub-electrode strips 311 arranged in a first direction (i.e., Z direction) and extending in a second direction (i.e., X direction), the circuit structure 320 includes a plurality of circuit sub-structures 321 arranged in an array in the first direction and the second direction, and in the first direction, an orthographic projection of each of the first sub-electrode strips 311 on the main surface of the piezoelectric layer 330 covers orthographic projections of the detection electrodes of at least two circuit sub-structures 321 on the main surface of the piezoelectric layer 330, that is, the size of each of the first sub-electrode strips 311 is at least more than twice the size of each of the circuit sub-structures 321 in the first direction, and the first sub-electrode strip 311 is overlapped with the circuit sub-structures 321 in the Y direction, that is, the orthographic projection of the first sub-electrode strip on the main surface of the piezoelectric layer is overlapped with the orthographic projections of the circuit sub-structures on the main surface of the piezoelectric layer.

For example, as illustrated by FIGS. 4A-4C, the piezoelectric layer 330 includes a first piezoelectric layer 331 and a second piezoelectric layer 332, the touch detection structure 100 and the fingerprint identification structure 200 share an ultrasonic excitation portion 3001, the ultrasonic excitation portion 3001 includes a first electrode 310, a second electrode 340, and a first piezoelectric layer 331 located between the first electrode 310 and the second electrode 340, and the second electrode 340 includes a plurality of second sub-electrode strips 341 arranged in a second direction and extending in the first direction. The second sub-electrode 341 in the present embodiment functions as a touch detection electrode for outputting a touch detection signal to the integrated circuit 306.

For example, as illustrated by FIG. 4B, upon the ultrasonic excitation unit 3001 being used as the ultrasonic excitation unit of the touch detection structure 100, the touch detection stage includes a first ultrasonic emitting stage, which includes: inputting a first electrical signal (high voltage sinusoidal wave signal) to the first sub-electrode strip 311 of an N-th (N is an integer greater than or equal to 1, and less than or equal to a total number of the first sub-electrode strips) row included in the first electrode 310.

The second sub-electrodes 341 included in the he second electrode 340 are applied with a fixed voltage through the integrated circuit 306, so that the first piezoelectric layer 331 is excited by the voltage to generate an inverse piezoelectric effect and emit a first ultrasonic signal outward.

For example, as illustrated by FIG. 4A, the ultrasonic excitation unit 3001 is reused as the first ultrasonic detection unit 3002 of the touch detection structure 100. According to the circuit structure shown in FIG. 4B, the touch detection stage further includes a first detection stage, which includes: applying a fixed voltage to the first sub-electrode strip 311 of the N-th row, and outputting a third electrical signal generated by the first piezoelectric layer 331 under the action of the reflected third ultrasonic signal through the second sub-electrode 341 to perform touch detection.

The first ultrasonic signal may be reflected by an object at a touch position, such as a finger and air at a non-touch position. In the present embodiment, the ultrasonic signals reflected back to the first piezoelectric layer 331 by the finger at the touch position and air at the non-touch position are all referred to as third ultrasonic signals. At this time, upon a fixed voltage being input to the first sub-electrode 311 of the N-th row, the first piezoelectric layer 331 converts the third ultrasonic signal into a third electrical signal, and the second sub-electrode 341 transmits the generated third electrical signal to the integrated circuit 306 to achieve touch position detection.

For example, as illustrated by FIG. 4A, the fingerprint identification structure 200 further includes a second ultrasonic detection portion 3003 including a circuit structure 320, a second electrode 340, and a second piezoelectric layer 332 located between the circuit structure 320 and the second electrode 340, which are arranged in a stacked manner. The second ultrasonic detection unit 3003 and the first ultrasonic detection unit 3002 in the present embodiment share the second electrode 340, which can reduce the thickness of the touch panel.

For example, as illustrated by FIGS. 4A and 4C, the touch panel further includes a plurality of detection lines 301 extending in a first direction and a plurality of gate lines 302 extending in a second direction. The gate line 302 and detection line 301 are connected with each circuit sub-structure 321 respectively, and a plurality of detection lines 301 are connected with an integrated circuit (IC) 306. The gate line 302 functions as a switching signal input line of the circuit sub-structure 321, and the detection line 301 is configured to transmit an electrical signal upon the gate line 302 being in an on state.

For example, the specific structure of the circuit sub-structure 321 in the present embodiment may be the same as the structure of the circuit sub-structure 221 in the embodiment shown in FIG. 2A, and will not be described here again.

For example, as illustrated by FIGS. 4B and 4C, the plurality of circuit sub-structures 321 may be divided into a plurality of circuit structure sub-regions 3200 arranged in an array in a first direction and a second direction. In a direction perpendicular to the second piezoelectric layer 332, a row of circuit structure sub-regions 3200 is opposite to a first sub-electrode strip 311, that is, an orthographic projection of a row of circuit structure sub-regions 3200 on the piezoelectric layer 330 is overlapped with an orthographic projection of a first sub-electrode strip 311 on the piezoelectric layer 330. The number of rows of the circuit structure sub-regions 3200 is equal to the number of the first sub-electrode strips 311, i.e., a plurality of rows of circuit structure sub-regions 3200 correspond to the plurality of first sub-electrode strips 311 in one-to-one correspondence. The present embodiment is not limited thereto, and the circuit sub-structure may not be divided into regions, but the corresponding relationship between the circuit sub-structure and the first sub-electrode strip is the same as above.

For example, upon the ultrasonic excitation unit 3001 being used as the ultrasonic excitation unit of the fingerprint identification structure 200, the fingerprint identification stage includes a second ultrasonic emitting stage, which includes: after determining that the positions of the first sub-electrode strip 311 of the M-th row (M is an integer equal to or greater than 1, and equal to or less than a total number of the first sub-electrode strips) and the second sub-electrode strip 341 of the M-th column are touch regions according to the touch detection stage, inputting a first electrical signal to the first sub-electrode strip 311 of an M-th row and applying a fixed voltage to the second sub-electrode strip 341 of the M-th column to excite the first piezoelectric layer 331 by the voltage to generate an inverse piezoelectric effect and emit a first ultrasonic signal outward. The present embodiment is not limited thereto, and driving voltages may be applied to all the first sub-electrode strips and all the second sub-electrode strips to cause the first piezoelectric layer to emit the first ultrasonic signal.

For example, as illustrated by FIGS. 4A-4C, the fingerprint identification stage further includes a second detection stage, which includes: applying a fixed voltage to the second sub-electrode strip 341 of the M-th column, and outputting a second electrical signal generated by the second piezoelectric layer 332 under the action of the reflected second ultrasonic signal through each row of circuit sub-structures 321 corresponding to the M-th row of first sub-electrode strips 311 in a direction perpendicular to the main plane of the second piezoelectric layer 332 for fingerprint identification. The present embodiment is not limited thereto. It is possible that each of the second sub-electrode strips 341 may be applied with a fixed voltage, and the second electric signal generated by the second piezoelectric layer 332 under the action of the reflected second ultrasonic signal may be output by each row of circuit sub-structures 321 corresponding to the first sub-electrode strips 311 of the M-th row in a direction perpendicular to the main plane of the second piezoelectric layer 332 for fingerprint identification. In the present embodiment, each row of circuit sub-structures 321 corresponding to the first sub-electrode strips 311 of the M-th row in a direction perpendicular to the main plane of the second piezoelectric layer 332 are each row of circuit sub-structures 321 included of the M-th row of circuit structure sub-regions 3200 corresponding to the M-th row of first sub-electrode strips 311.

For example, after the first ultrasonic signal contacts a finger, the second ultrasonic signal is reflected back to the second piezoelectric layer 332. At this time, upon a fixed voltage being applied to the second electrode 340 (or the second sub-electrode 341 of the M-th column), the second piezoelectric layer 332 converts the second ultrasonic signal into a second electrical signal, and the circuit sub-structures 321 corresponding to the first sub-electrode strip 311 of the M-th row in a direction perpendicular to the main plane of the second piezoelectric layer 332 transmit the second electrical signal to the integrated circuit 306 line by line through the detection line 301 to achieve fingerprint identification.

For example, as illustrated by FIGS. 4A-4C, upon the circuit sub-structures 321 outputting the second electrical signal generated by the second piezoelectric layer 332, the plurality of gate lines 302 connected with the plurality of circuit sub-structures 321 transmitting the second electrical signal are input with a first turn-on voltage line by line so that the circuit sub-structures 321 are in an operating state line by line, and the detection line 301 connected with the circuit sub-structures 321 can transmit the second electrical signal received by the circuit sub-structures 321 to the integrated circuit 306 line by line for fingerprint identification.

For example, as illustrated by FIG. 4A, the second ultrasonic detection portion 3003 is located on a side of the ultrasonic excitation portion 3001 facing the operation surface 360 for touch detection or fingerprint identification to reduce the influence generated upon the ultrasonic excitation portion performing fingerprint identification on the second ultrasonic detection portion.

In the present embodiment, the ultrasonic signal generated by the first piezoelectric layer is referred to as the first ultrasonic signal regardless of the touch detection or fingerprint identification stage. The reflected ultrasonic signals received by the first piezoelectric layer are referred to as the third ultrasonic signals for touch detection, and the reflected ultrasonic signals received by the second piezoelectric layer are all referred to as second ultrasonic signals for fingerprint identification.

Figure 5:
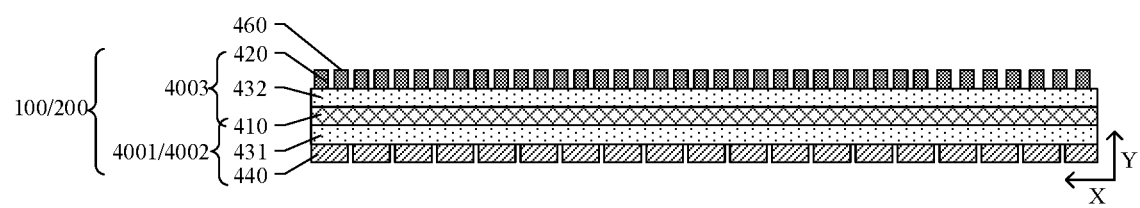
FIG. 5 is a partial cross-sectional structural diagram of a touch panel according to another embodiment of the present disclosure.

Another embodiment of the present disclosure provides a touch panel, and FIG. 5 is a schematic partial cross-sectional view of the touch panel provided in the embodiment. As illustrated by FIG. 5, the touch panel provided in the present embodiment includes a touch detection structure 100 and a fingerprint identification structure 200. The touch detection structure 100 and the fingerprint identification structure 200 share an ultrasonic excitation portion 4001, which includes a first electrode 410, a second electrode 440, and a first piezoelectric layer 431 located between the first electrode 410 and the second electrode 440, which are stacked. The second electrode 440 includes a plurality of second sub-electrode strips 441 arranged in a second direction and extending in the first direction. The second sub-electrode 441 in the present embodiment functions as a touch detection electrode for outputting a touch detection signal to the integrated circuit. The planar structures of the first sub-electrode strip included in the first electrode 410 and the second sub-electrode strip included in the second electrode 440 in the present embodiment are the same as the planar structures of the first sub-electrode strip 311 included in the first electrode 310 and the second sub-electrode strip 341 included in the second electrode 340 in the embodiment shown in FIG. 4B, and will not be repeated here.

For example, the operation principle of the ultrasonic excitation portion 4001 in the present embodiment serving as the ultrasonic excitation portion of the touch detection structure 100 is the same as that of the ultrasonic excitation portion 3001 in the embodiment shown in FIGS. 4A-4C, that is, the driving method of the first ultrasonic emitting stage in the touch detection stage in the present embodiment is the same as that included in the embodiment shown in FIGS. 4A-4C, and will not be repeated here.

For example, as illustrated by FIG. 5, the ultrasonic excitation portion 4001 is reused as the first ultrasonic detection portion 4002 of the touch detection structure 100. the working principle of the first ultrasonic detection portion 4002 in the present embodiment is the same as that of the first ultrasonic detection portion 3002 in the embodiment shown in FIGS. 4A-4C, that is, the driving method of the first detection phase included in the touch detection phase in the present embodiment is the same as that included in the embodiment shown in FIGS. 4A-4C, and will not be described here again.

For example, as illustrated by FIG. 5, the fingerprint identification structure 200 further includes a second ultrasonic detection portion 4003 including a circuit structure 420, a first electrode 410, and a second piezoelectric layer 432 located between the circuit structure 420 and the first electrode 410, which are arranged in a stacked manner. The first ultrasonic detection unit 4002 and the second ultrasonic detection unit 4003 in the present embodiment share the first electrode 410, so that the thickness of the touch panel can be reduced.

The planar structure of the circuit structure 420 in the present embodiment is the same as the planar structure of the circuit structure 320 shown in FIG. 4C. the specific structure of the plurality of circuit sub-structures included in the circuit structure 420 is the same as the structure of the circuit sub-structure 321 shown in FIG. 4C, and the connection relationship between the circuit sub-structure, the gate line and the detection line in the present embodiment is also the same as the connection relationship shown in FIG. 4C, which is not repeated here.

For example, as illustrated by FIG. 5, upon the second ultrasonic detection unit 4003 being used for fingerprint identification, the fingerprint identification stage includes a second ultrasonic emitting stage, which includes: after determining that the positions of the first sub-electrode strip of the M-th row and the second sub-electrode strip of the M-th column are touch regions according to the touch detection stage, applying a first electrical signal to the first sub-electrode strip of the M-th row, and applying a fixed voltage to the second sub-electrode strip of the M-th column to cause the first piezoelectric layer 431 to emit a first ultrasonic signal. Or, a first electrical signal is applied to all the first sub-electrode strips and a fixed voltage is applied to all the second sub-electrode strips so that the first piezoelectric layer 431 emits the first ultrasonic signal.

For example, the fingerprint identification stage further includes a second detection stage, which includes: applying a fixed voltage to the first sub-electrode strips of the M-th row or applying a fixed voltage to each of the first sub-electrode strips, and outputting a second electrical signal generated by the second piezoelectric layer under the action of the reflected second ultrasonic signal through each row of circuit sub-structures corresponding to the first sub-electrode strips of the M-th row in a direction perpendicular to the main plane of the second piezoelectric layer 432 for fingerprint identification.

For example, as illustrated by FIG. 5, upon the circuit sub-structures outputting a second electrical signal, a plurality of gate lines connected with a plurality of circuit sub-structures transmitting the second electrical signal are input with a first turn-on voltage line by line so that the circuit sub-structures are in an operating state line by line, and a detection line connected with the circuit sub-structures can transmit the second electrical signal received by the circuit sub-structures to the integrated circuit line by line for fingerprint identification.

The embodiment shown in FIG. 5 differs from the embodiment shown in FIGS. 4A-4C in that the positions of the first electrode and the second electrode are interchanged.

Figure 6A:
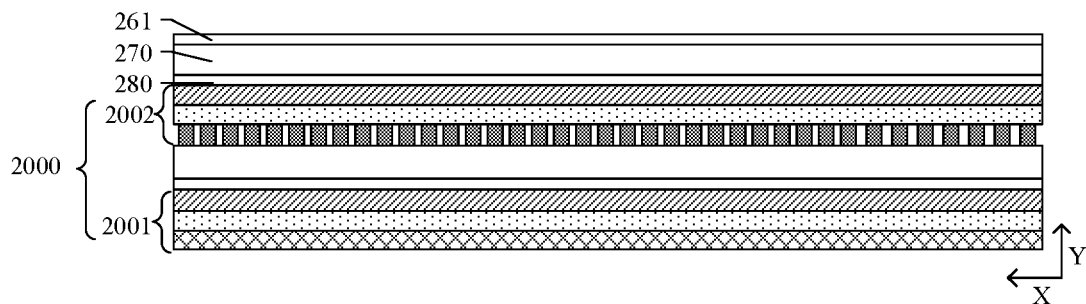
FIG. 6A is a partial cross-sectional structural diagram of a display device according to an example of another embodiment of the present disclosure.

Another embodiment of the present disclosure provides a display device. FIG. 6A is a partial cross-sectional structural diagram of the display device provided by an example of the embodiment. As illustrated by FIG. 6A, the display device provided in the present embodiment includes the touch panel 2000 shown in FIG. 2A, and the operation surface 260 for touch detection or fingerprint identification in the touch panel shown in FIG. 2A is the surface of the touch panel for achieving touch detection or fingerprint identification. The display device further includes a display panel 270 located between the cover plate 261 and the touch panel 2000, i.e., the display panel 270 is located on the side of the touch detection or fingerprint identification operation surface of the touch panel away from the touch detection structure. The display panel 270 and the touch panel 2000 are bonded by a second colloid 280. In the display device provided by the present embodiment, because the touch panel 2000 that achieves the touch detection and fingerprint identification functions is located on a side of the display panel 270 away from the cover plate 261, the display panel provided by the present embodiment has higher transmittance of images displayed and better display quality compared with a common display device that places the touch layer on the side of the display panel for display.

In the actual process, the impedance, thickness and young's modulus of the materials of each film layer (including each film layer in the display panel) before the ultrasonic signal emitted by the piezoelectric layer contacts the cover plate need to be matched to reduce the influence of the film layers on the ultrasonic signal.

Figure 6B:
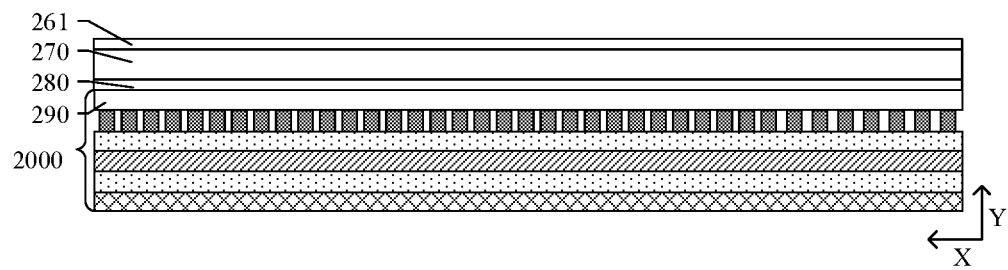
FIG. 6B is a partial cross-sectional structural diagram of a display device provided by another example of another embodiments of the present disclosure.

FIG. 6B shows a partial sectional structural diagram of a display device provided by another example of the present embodiment. As illustrated by FIG. 6B, the display device provided in this example includes the touch panel 2000 shown in FIG. 2G. The touch panel 2000 in the present embodiment further includes a second substrate 290 located on a side of the circuit structure facing the display panel 270 for carrying the circuit structure. An impedance matching layer (not shown) may also be provided between the second substrate 290 and the circuit structure in this example to reduce the impedance difference between the two, thereby reducing the influence of the impedance difference on the ultrasonic signal. The positional relationship and connection relationship between the touch panel 2000 and the display panel 270 in this example are the same as those of the display device shown in FIG. 6A, and will not be described here again.

Figure 6C:
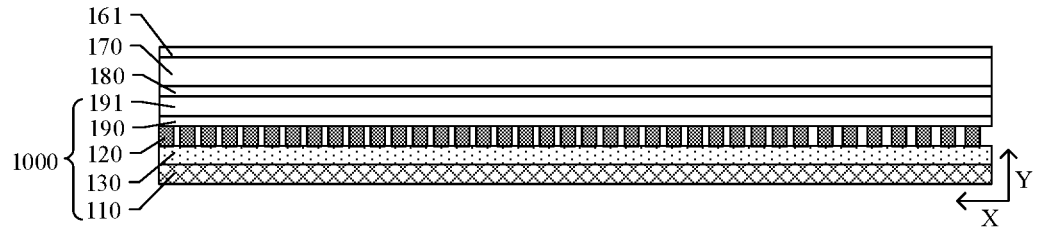
FIG. 6C is a partial sectional structural diagram of a display device according to another embodiment of the present disclosure.

Another embodiment of the present disclosure provides a display device. FIG. 6C is a partial cross-sectional structural diagram of the display device provided in the embodiment. As illustrated by FIG. 6C, the display device provided in the present embodiment includes the touch panel 1000 shown in FIG. 3. The display device includes a cover plate 161, an operation surface 160 for touch detection or fingerprint identification of the touch panel 1000 is the surface of the touch panel 1000 for achieving touch detection or fingerprint identification. The display device further includes a display panel 170 located between the cover plate 161 and the touch panel 1000, that is, the display panel 170 is located on a side of the operation surface of the touch detection or fingerprint identification of the touch panel 1000 away from the touch detection structure, and the touch panel is located on a non-display side of the display panel. And, the display panel 170 and the touch panel 1000 are bonded by a third colloid 180.

The touch panel 1000 in the present embodiment further includes a third substrate 191 located on the side of the circuit structure 120 facing the display panel 170 for carrying the circuit structure 120. In this example, a first impedance matching layer 190 may also be provided between the third substrate 191 and the circuit structure 120 to reduce the impedance difference between the third substrate 191 and the circuit structure 120, thereby reducing the influence of the impedance difference on ultrasonic signals.

In the display device provided by the present embodiment, because the touch panel 1000 that achieves the touch detection and fingerprint identification functions is located on the side of the display panel 170 away from the cover plate 161, the display panel provided by the present embodiment has higher transmittance of images displayed and better display quality compared with a common display device that places the touch layer on the side of the display panel for display.

Figure 6D:
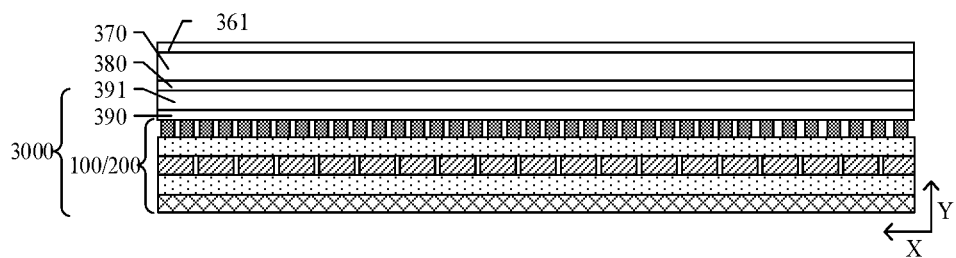
FIG. 6D is a partial sectional structural diagram of a display device according to another embodiment of the present disclosure.

Another embodiment of the present disclosure provides a display device. FIG. 6D is a partial cross-sectional structural diagram of the display device provided in the embodiment. As illustrated by FIG. 6D, the display device provided in the present embodiment includes the touch panel 3000 shown in FIG. 4A, and the display device includes a cover plate 361. An operation surface 360 for touch detection or fingerprint identification of the touch panel is the surface of the touch panel for realizing touch detection or fingerprint identification. The display device further includes a display panel 370 located between the cover plate 361 and the touch panel 3000, i.e., the display panel 370 is located on a side of an operation surface for touch detection or fingerprint identification of the touch panel, the touch panel is located on the non-display side of the display panel, and the display panel 370 and the touch panel 3000 are bonded by a fourth colloid 380.

The touch panel 3000 in the present embodiment further includes a fourth substrate 391 located on the side of the circuit structure facing the display panel 370 for carrying the circuit structure. A second impedance matching layer 390 may also be provided between the fourth substrate 391 and the circuit structure in this example to reduce the impedance difference between the fourth substrate 391 and the circuit structure, thereby reducing the influence of the impedance difference on the ultrasonic signal.

In the display device provided by the present embodiment, because the touch panel 3000 realizing the touch detection and fingerprint identification functions is located on the side of the display panel 370 away from the cover plate 361, the display panel provided by the present embodiment has higher transmittance of images displayed and better display quality compared with a common display device in which the touch layer is disposed on the side of the display panel for display.

Figure 6E:
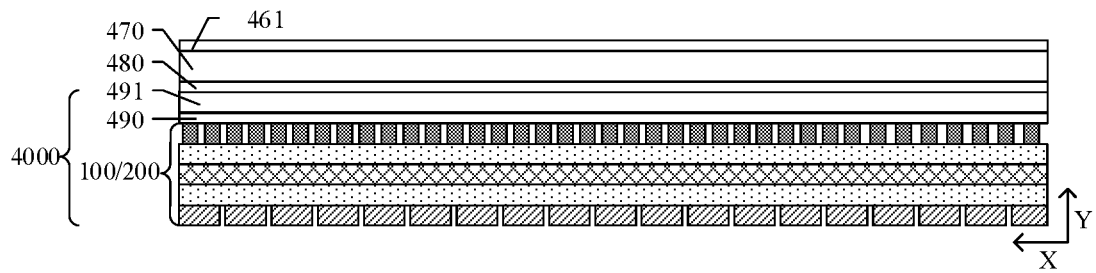
FIG. 6E is a partial sectional structural diagram of a display device according to another embodiment of the present disclosure.

Another embodiment of the present disclosure provides a display device. FIG. 6E is a partial cross-sectional structural diagram of the display device provided in the embodiment. As illustrated by FIG. 6E, the display device provided in the present embodiment includes the touch panel 4000 shown in FIG. 5, and the display device includes a cover plate 461. An operation surface of the touch panel for touch detection or fingerprint identification is the surface of the touch panel for achieving touch detection or fingerprint identification. The display device further includes a display panel 470 located between the cover plate 461 and the touch panel 4000, that is, the display panel 470 is located on the side of the operation surface for touch detection or fingerprint identification of the touch panel, the touch panel is located on the non-display side of the display panel, and the display panel 470 and the touch panel 4000 are bonded by a fifth colloid 480.

The touch panel 4000 in the present embodiment further includes a fifth substrate 491 located on the side of the circuit structure facing the display panel 470 for carrying the circuit structure. A third impedance matching layer 490 may also be provided between the fifth substrate 491 and the circuit structure in this example to reduce the impedance difference between the fifth substrate 491 and the circuit structure, thereby reducing the influence of the impedance difference on the ultrasonic signal.

In the display device provided in the present embodiment, because the touch panel 4000 that achieves the touch detection and fingerprint identification functions is located on a side of the display panel 470 away from the cover plate 461, the touch panel in the present embodiment is located on the non-display side of the display panel, so that the transmittance of the image displayed by the display panel is higher, and the display quality is better than that of the general display device that places the touch layer on the side of the display panel for display. Of course, the embodiment of the present disclosure is not limited to that the touch panel must be located on the non-display side of the display panel, and the touch panel may also be located on the display side of the display panel.

For example, the display device provided by the embodiment of the present disclosure may be a display device such as a liquid crystal display device, an organic light-emitting diode (OLED) display device, and any product or component having a display function including a television, a digital camera, a mobile phone, a watch, a tablet computer, a notebook computer, a navigator, and the like, and the embodiment is not limited thereto.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, Thus, the protection scope of the present disclosure should be based on the protection scope of the claims.

What is claimed is:

1. A touch panel, comprising:
a first electrode, a circuit structure, and a piezoelectric layer that are stacked,
wherein the first electrode, the circuit structure, and the piezoelectric layer that are stacked are configured to function as a touch detection structure and a fingerprint identification structure;
the piezoelectric layer is configured to emit and/or receive an ultrasonic wave;
in a plane parallel to a main surface of the piezoelectric layer, the first electrode comprises a plurality of first sub-electrode strips arranged in a first direction and extending in a second direction, the circuit structure comprises a plurality of circuit sub-structures arranged in an array in the first direction and the second direction, each of the plurality of circuit sub-structures comprises a detection electrode; and
in the first direction, an orthographic projection of each of the plurality of first sub-electrode strips on the main surface of the piezoelectric layer covers orthographic projections of detection electrodes of at least two of the plurality of circuit sub-structures on the main surface of the piezoelectric layer.

2. The touch panel according to claim 1, further comprising:
a plurality of detection lines extending in the first direction and a plurality of gate lines extending along the second direction,
wherein each of the circuit sub-structures further comprises a first thin film transistor;
each of the gate lines is connected with a gate electrode of the first thin film transistor;
each of the detection lines is connected with one of a source electrode and a drain electrode of the first thin film transistor;
the detection electrode of the circuit sub-structure is configured to be connected with the drain electrode of the first thin film transistor corresponding to the source electrode connected with the detection line or the source electrode of the first thin film transistor corresponding to the drain electrode connected with the detection line.

3. The touch panel according to claim 2, wherein, the plurality of circuit sub-structures function as a plurality of touch detection regions arranged in an array in the first direction and the second direction;
a row of the touch detection regions arranged along the second direction is a touch detection region group, and a plurality of touch detection region groups arranged in the first direction correspond to the plurality of first sub-electrode strips in one-to-one correspondence.

4. The touch panel according to claim 3, wherein any two adjacent detection lines of the plurality of detection lines connected with the plurality of circuit sub-structures in a column of the touch detection regions arranged in the first direction are respectively connected with a source electrode and a drain electrode of a second thin film transistor;
the touch panel further comprises a signal line extending in the second direction, and the signal line is connected with a gate electrode of the second thin film transistor.

5. The touch panel according to claim 4, wherein the touch detection structure is reused as the fingerprint identification structure, and the touch detection structure is a stacked structure comprising the first electrode, the circuit structure, and the piezoelectric layer located between the first electrode and the circuit structure.

6. The touch panel according to claim 4, wherein the piezoelectric layer comprises a first piezoelectric layer and a second piezoelectric layer, and the touch detection structure and the fingerprint identification structure comprise an ultrasonic excitation portion and an ultrasonic detection portion which are shared;
the ultrasonic excitation portion comprises the first electrode, a second electrode, and the first piezoelectric layer located between the first electrode and the second electrode, which are stacked;
the ultrasonic detection portion comprises the circuit structure, a third electrode, and the second piezoelectric layer located between the circuit structure and the third electrode, which are stacked.

7. The touch panel according to claim 6, further comprising an operation surface for touch detection or fingerprint identification, wherein the ultrasonic excitation portion is located on a side of the ultrasonic detection portion away from the operation surface.

8. The touch panel according to claim 6, wherein the second electrode and the third electrode are plate-shaped electrodes covering the plurality of touch detection regions, and are configured to be applied with a fixed voltage.

9. The touch panel according to claim 6, wherein the second electrode and the third electrode are a same electrode.

10. The touch panel according to claim 2, wherein the piezoelectric layer comprises a first piezoelectric layer and a second piezoelectric layer;

the touch detection structure and the fingerprint identification structure share an ultrasonic excitation portion;
the ultrasonic excitation portion comprises the first electrode, a second electrode, and the first piezoelectric layer located between the first electrode and the second electrode, which are stacked;
the second electrode comprises a plurality of second sub-electrode strips arranged along the second direction and extending in the first direction.

11. The touch panel according to claim 10, wherein the ultrasonic excitation portion is reused as a first ultrasonic detection portion of the touch detection structure;

the fingerprint identification structure further comprises a second ultrasonic detection portion;
the second ultrasonic detection portion comprises the circuit structure, the second electrode, and the second piezoelectric layer located between the circuit structure and the second electrode, which are stacked; or, the second ultrasonic detection portion comprises the circuit structure, the first electrode, and the second piezoelectric layer located between the circuit structure and the first electrode, which are stacked.

12. The touch panel according to claim 11, further comprising an operation surface for touch detection or fingerprint identification, wherein the second ultrasonic detection portion is located on a side of the ultrasonic excitation portion facing the operation surface.

13. A display device, comprising a display panel and the touch panel according to claim 1, wherein the touch panel is located on a non-display side of the display panel.

14. A driving method of the touch panel according to claim 1, comprising a touch detection stage and a fingerprint identification stage, wherein the driving method comprises:

applying a first electrical signal to the first sub-electrode strip of an N-th row to excite the piezoelectric layer to emit a first ultrasonic signal;
the piezoelectric layer converts a second ultrasonic signal reflected back from a side of an operation surface for touch detection or fingerprint identification of the touch panel into a second electrical signal, and the circuit structure outputs the second electrical signal, N is an integer greater than or equal to 1, and less than or equal to a total number of the first sub-electrode strips.

15. The driving method according to claim 14, wherein the touch detection structure is reused as the fingerprint identification structure, and the touch detection structure is a stacked structure comprising the first electrode, the circuit structure, and the piezoelectric layer located between the first electrode and the circuit structure, and the plurality of circuit sub-structures are divided into a plurality of touch detection regions arranged in an array in the first direction and the second direction, and a row of the touch detection regions arranged along the second direction is a touch detection region group, and a plurality of touch detection region groups arranged in the first direction correspond to the plurality of first sub-electrode strips in one-to-one correspondence, the touch detection stage comprises a first ultrasonic emitting stage and a first detection stage;
the first ultrasonic emitting stage comprises: applying the first electrical signal to the first sub-electrode strip of the N-th row, and applying a fixed voltage to the plurality of circuit sub-structures comprised in the touch detection regions of the N-th row corresponding to the first sub-electrode strip of the N-th row to excite the piezoelectric layer to emit the first ultrasonic signal;
the first detection stage comprises: applying a fixed voltage to the first sub-electrode strip of the N-th row, and outputting the second electrical signal through the plurality of circuit sub-structures comprised in the touch detection regions of the N-th row to perform touch detection.

16. The driving method according to claim 15, wherein the fingerprint identification stage comprises a second ultrasonic emitting stage and a second detection stage;

the second ultrasonic emitting stage comprises: after judging that a position of the first sub-electrode strip of an M-th row is a touch region according to the touch detection stage, applying the first electrical signal to the first sub-electrode strip of the M-th row, and applying a fixed voltage to the plurality of circuit sub-structures comprised in the touch detection region of the M-th row corresponding to the first sub-electrode strip of the M-th row to excite the piezoelectric layer to emit the first ultrasonic signal; or, applying the first electrical signal to each of the plurality of first sub-electrode strips, and applying a fixed voltage to each of the plurality of circuit sub-structures to excite the piezoelectric layer to emit the first ultrasonic signal;
the second detection stage comprises: applying a fixed voltage to the first sub-electrode strip of the M-th row, and outputting the second electrical signal through the circuit sub-structures in each row in the touch detection regions of the M-th row to perform fingerprint identification, M is an integer greater than or equal to 1, and less than or equal to the total number of the first sub-electrode strips.

17. The driving method according to claim 14, wherein the piezoelectric layer comprises a first piezoelectric layer and a second piezoelectric layer, the touch detection structure and the fingerprint identification structure share a ultrasonic excitation portion and an ultrasonic detection portion, and the ultrasonic excitation portion comprises the first electrode, a second electrode and the first piezoelectric layer located between the first electrode and the second electrode, which are stacked; the ultrasonic detection portion comprises the circuit structure, a third electrode and the second piezoelectric layer located between the circuit structure and the third electrode, which are stacked; the plurality of circuit sub-structures are divided into a plurality of touch detection regions arranged in an array in the first direction and the second direction, a row of the touch detection regions arranged along the second direction is a touch detection region group, and a plurality of touch detection region groups arranged in the first direction correspond to the plurality of first sub-electrode strips in one-to-one correspondence, the touch detection stage comprises a first ultrasonic emitting stage and a first detection stage;
the first ultrasonic emitting stage comprises: applying the first electrical signal to the first sub-electrode strip of the N-th row, and applying a fixed voltage to the second electrode to excite the first piezoelectric layer to emit the first ultrasonic signal;
the first detection stage comprises: applying a fixed voltage to the third electrode, and outputting the second electrical signal through the touch detection regions of the N-th row corresponding to the first sub-electrode strip of the N-th row to perform touch detection.

18. The driving method according to claim 17, wherein the fingerprint identification stage comprises a second ultrasonic emitting stage and a second detection stage, the second ultrasonic emitting stage comprises: after judging that a position of the first sub-electrode strip of an M-th row is a touch region according to the touch detection stage, applying the first electrical signal to the first sub-electrode strip of the M-th row, and applying a fixed voltage to the second electrode to excite the first piezoelectric layer to emit the first ultrasonic signal; or, applying the first electrical signal to each of first sub-electrode strips, and applying a fixed voltage to the second electrode to excite the first piezoelectric layer to emit the first ultrasonic signal;

the second detection stage comprises: applying a fixed voltage to the third electrode, and outputting the second electrical signal through the circuit sub-structures of each row in the touch detection regions of the M-th row corresponding to the first sub-electrode strip of the M-th row for fingerprint identification, M is an integer greater than or equal to 1, and less than or equal to the total number of the first sub-electrode strips.

19. The driving method according to claim 16, wherein a plurality of detection lines extending in the first direction and a plurality of gate lines extending in the second direction, each of the gate lines is connected with a gate electrode of a first thin film transistor comprised in the circuit sub-structure, and each of the detection lines is connected with one of a source electrode and a drain electrode of the first thin film transistor comprised in the circuit sub-structure;

the gate line is configured as a switching signal transmission line of the circuit sub-structure;

upon the first thin film transistor being in an ON state, the detection line is configured to detect an electrical signal;

any two adjacent detection lines of the plurality of detection lines connected with the plurality of circuit sub-structures in a column of the touch detection regions arranged in the first direction are respectively connected with a source electrode and a drain electrode of a second thin film transistor;

the touch panel further comprises: a signal line extending in the second direction, the signal line is connected with a gate electrode of the second thin film transistor, and configured to transmit a signal to turn on or off the second thin film transistor, in the first detection stage, a first turn-on voltage is input to the gate line connected with the circuit sub-structure in the touch detection regions of N-th row to make the circuit sub-structure in a working state, and the second thin film transistor is input with a second turn-on voltage by the signal line to conduct the plurality of detection lines connected with the plurality of circuit sub-structures in the touch detection regions of a column;

in the second detection stage, the first turn-on voltage is input to the gate lines connected with the circuit sub-structures in the touch detection regions of the M-th row to sequentially make the circuit sub-structures of each row in an operating state and the second thin film transistor is in an OFF state.

20. The driving method according to claim 14, wherein the piezoelectric layer comprises a first piezoelectric layer and a second piezoelectric layer, the touch detection structure and the fingerprint identification structure share a ultrasonic excitation portion, the ultrasonic excitation portion comprises the first electrode, a second electrode and the first piezoelectric layer located between the first electrode and the second electrode, which are stacked, the second electrode comprises a plurality of second sub-electrode strips arranged along the second direction and extending in the first direction, the touch detection stage comprises a first ultrasonic emitting stage, which comprises: applying the first electrical signal to the first sub-electrode strip of the N-th row, and applying a fixed voltage to each of the second sub-electrode strips to excite the first piezoelectric layer to emit the first ultrasonic signal;

the ultrasonic excitation portion is reused as a first ultrasonic detection portion of the touch detection structure, and the touch detection stage further comprises a first detection stage, which comprises: applying a fixed voltage to the first sub-electrode strip of the N-th row, and outputting a third electrical signal converted by the first piezoelectric layer into a third electrical signal through the second sub-electrode to perform touch detection.

* * * * *